US010628960B2

(12) United States Patent
Watanabe

(10) Patent No.: US 10,628,960 B2
(45) Date of Patent: Apr. 21, 2020

(54) INFORMATION PROCESSING APPARATUS, IMAGING APPARATUS, DEVICE CONTROL SYSTEM, MOVING OBJECT, INFORMATION PROCESSING METHOD, AND RECORDING MEDIUM

(71) Applicant: Genki Watanabe, Tokyo (JP)

(72) Inventor: Genki Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 15/783,307

(22) Filed: Oct. 13, 2017

(65) Prior Publication Data
US 2018/0144499 A1 May 24, 2018

(30) Foreign Application Priority Data

Nov. 24, 2016 (JP) .................................. 2016-228222
Sep. 6, 2017 (JP) .................................. 2017-171531

(51) Int. Cl.
*G06K 9/00* (2006.01)
*G06T 7/73* (2017.01)
*G06T 7/246* (2017.01)
*G06T 7/136* (2017.01)
*G06T 7/593* (2017.01)

(52) U.S. Cl.
CPC ................ *G06T 7/74* (2017.01); *G06T 7/136* (2017.01); *G06T 7/246* (2017.01); *G06T 7/248* (2017.01);
(Continued)

(58) Field of Classification Search
CPC ........... G06T 7/246; G06T 7/73; G06T 7/248; G06T 7/593; G06T 7/74; G06T 7/136;
(Continued)

(56) References Cited

U.S. PATENT DOCUMENTS 7,831,433 B1 * 11/2010 Belvin ..................... G10L 15/18
704/275
8,254,645 B2 * 8/2012 Okubo ................. G06K 9/6228
382/106

(Continued)

FOREIGN PATENT DOCUMENTS

JP 2009-122786 6/2009

Primary Examiner — Shefali D Goradia
(74) Attorney, Agent, or Firm — IPUSA, PLLC

(57) ABSTRACT

An information processing apparatus includes an obtaining unit configured to obtain information in which positions of an object in a vertical direction, positions in a horizontal direction, and positions in a depth direction at multiple points in time are associated with each other; a prediction unit configured to, based on a position of a predetermined object in the information previously obtained by the obtaining unit, predict a position of the predetermined object in the information currently obtained by the obtaining unit; and an extraction unit configured to extract, from the current information, multiple objects that satisfy a predetermined condition corresponding to the position of the predetermined object, and extract, based on a degree of similarity between each image of the multiple objects and an image of the predetermined object, a same object, of the multiple objects in the current information, as the predetermined object in the previous information.

11 Claims, 20 Drawing Sheets

(52) U.S. Cl.
CPC ............... *G06T 7/593* (2017.01); *G06T 7/73* (2017.01); *G06T 2207/10021* (2013.01); *G06T 2207/20036* (2013.01); *G06T 2207/20076* (2013.01); *G06T 2207/30196* (2013.01); *G06T 2207/30236* (2013.01); *G06T 2207/30252* (2013.01)

(58) Field of Classification Search
CPC . G06T 2207/10021; G06T 2207/20036; G06T 2207/20076; G06T 2207/30196; G06T 2207/30236; G06T 2207/30252
See application file for complete search history.

(56) References Cited

U.S. PATENT DOCUMENTS

| | | | |
|---|---|---|---|
| 8,374,438 B1* | 2/2013 | Wagner | .................... H04N 5/33 |
| | | | 250/330 |
| 9,111,209 B2 | 8/2015 | Utoh et al. | |
| 9,330,320 B2 | 5/2016 | Takahashi et al. | |
| 9,417,824 B2 | 8/2016 | Watanabe | |
| 9,501,720 B2* | 11/2016 | Kamiya | ............. G06K 9/00362 |
| 9,726,604 B2 | 8/2017 | Sekiguchi et al. | |
| 10,255,510 B2* | 4/2019 | Yu | ....................... G06K 9/00805 |
| 2005/0185844 A1* | 8/2005 | Ono | ..................... G06F 16/5854 |
| | | | 382/190 |
| 2012/0242835 A1 | 9/2012 | Li et al. | |
| 2013/0136307 A1* | 5/2013 | Yu | .......................... H04N 7/181 |
| | | | 382/103 |
| 2015/0071529 A1* | 3/2015 | Yokoi | .................. G06K 9/6256 |
| | | | 382/159 |
| 2015/0298621 A1* | 10/2015 | Katoh | .................... B60R 11/04 |
| | | | 348/148 |
| 2015/0332103 A1 | 11/2015 | Yokota et al. | |
| 2016/0019429 A1 | 1/2016 | Ishigaki et al. | |
| 2016/0277397 A1 | 9/2016 | Watanabe | |
| 2017/0041784 A1 | 2/2017 | Watanabe | |

\* cited by examiner

FIG.16

| OBJECT TYPE | WIDTH | HEIGHT | DEPTH | UNIT (mm) |
|---|---|---|---|---|
| MOTORCYCLE, BICYCLE | <1100 | <2500 | >1000 | |
| PEDESTRIAN | <1100 | <2500 | <=1000 | |
| COMPACT CAR | <1700 | <1700 | <10000 | |
| ORDINARY VEHICLE | <1700 | <2500 | <10000 | |
| TRUCK | <3500 | <3500 | <15000 | |
| OTHERS | OTHER THAN SPECIFIED ABOVE | | | |

INFORMATION PROCESSING APPARATUS, IMAGING APPARATUS, DEVICE CONTROL SYSTEM, MOVING OBJECT, INFORMATION PROCESSING METHOD, AND RECORDING MEDIUM

BACKGROUND OF THE INVENTION

1. Field of the Invention

The present invention relates to an information processing apparatus, an imaging apparatus, a device control system, a moving body, an information processing method, and a recording medium.

2. Description of the Related Art

Conventionally, the development of a body structure of an automotive vehicle has been made for the purpose of promoting the safety and protection of vehicle occupants or pedestrians when the vehicle collides with another vehicle or pedestrians. In recent years, however, with the advance in information processing and image processing technologies, a technique for speedily detecting other people and vehicles ahead of an automotive vehicle has been developed. An automotive vehicle incorporating an automatic braking system has already come on the market, which utilizes the above technique to automatically put on brakes on the vehicle before collision and to prevent the vehicle from hitting a pedestrian or colliding with another vehicle.

In order to automatically put on brakes on the vehicle, it is necessary to measure a distance to a pedestrian or another vehicle, and a technique for performing measurement using images obtained from a stereo camera has been put into practical use (refer to, for example, Patent Document 1).

In a field of measurement using images obtained from a stereo camera, a technique is known which is used for, after detecting an object such as another vehicle ahead of the vehicle by using a parallax image of a frame, tracking the object in parallax images of the following frames.

CITATION LIST

Patent Document

[Patent Document 1] Japanese Unexamined Patent Application Publication No. 2009-122786

SUMMARY OF THE INVENTION

Technical Problem

However, in the conventional techniques, there is a problem in which, for example, due to an error caused by an ambient illumination change or due to a change of a moving speed or a moving direction of the object, etc., one object detected in the previous frame may be mistakenly determined to be the same object as another object detected in the current frame. Further, for example, in a case where pedestrians pass each other, or multiple vehicles with similar colors and shapes are running in parallel, there is a problem in which one object detected in the previous frame may be mistakenly determined to be the same object as another object detected in the current frame.

In view of the above, it is an object of the present invention to provide a technique for maintaining the tracking with high accuracy.

Solution to Problem

An information processing apparatus is provided. The information processing apparatus includes an obtaining unit configured to obtain information in which positions of an object in a longitudinal direction, positions in a lateral direction, and positions in a depth direction at multiple points in time are associated with each other; a prediction unit configured to, based on a position of a predetermined object in the information previously obtained by the obtaining unit, predict a position of the predetermined object in the information currently obtained by the obtaining unit; and an extraction unit configured to extract, from the previous information, a plurality of objects that satisfy a predetermined condition corresponding to the position of the predetermined object, and extract, based on a degree of similarity between an image of the predetermined object and each of images of the plurality of the objects, a same object, of the plurality of objects in the previous information, as the predetermined object in the current information.

Advantageous Effects of Invention

According to the provided technique, it is possible to maintain the tracking with high accuracy.

BRIEF DESCRIPTION OF THE DRAWINGS

FIG. 16 is a drawing illustrating an example of table data used for performing object type classification.

DETAILED DESCRIPTION OF THE PREFERRED EMBODIMENTS

In the following, a device control system having an image processing apparatus according to an embodiment of the present invention will be described.

(Structure of Device Control System)

Figure 1:
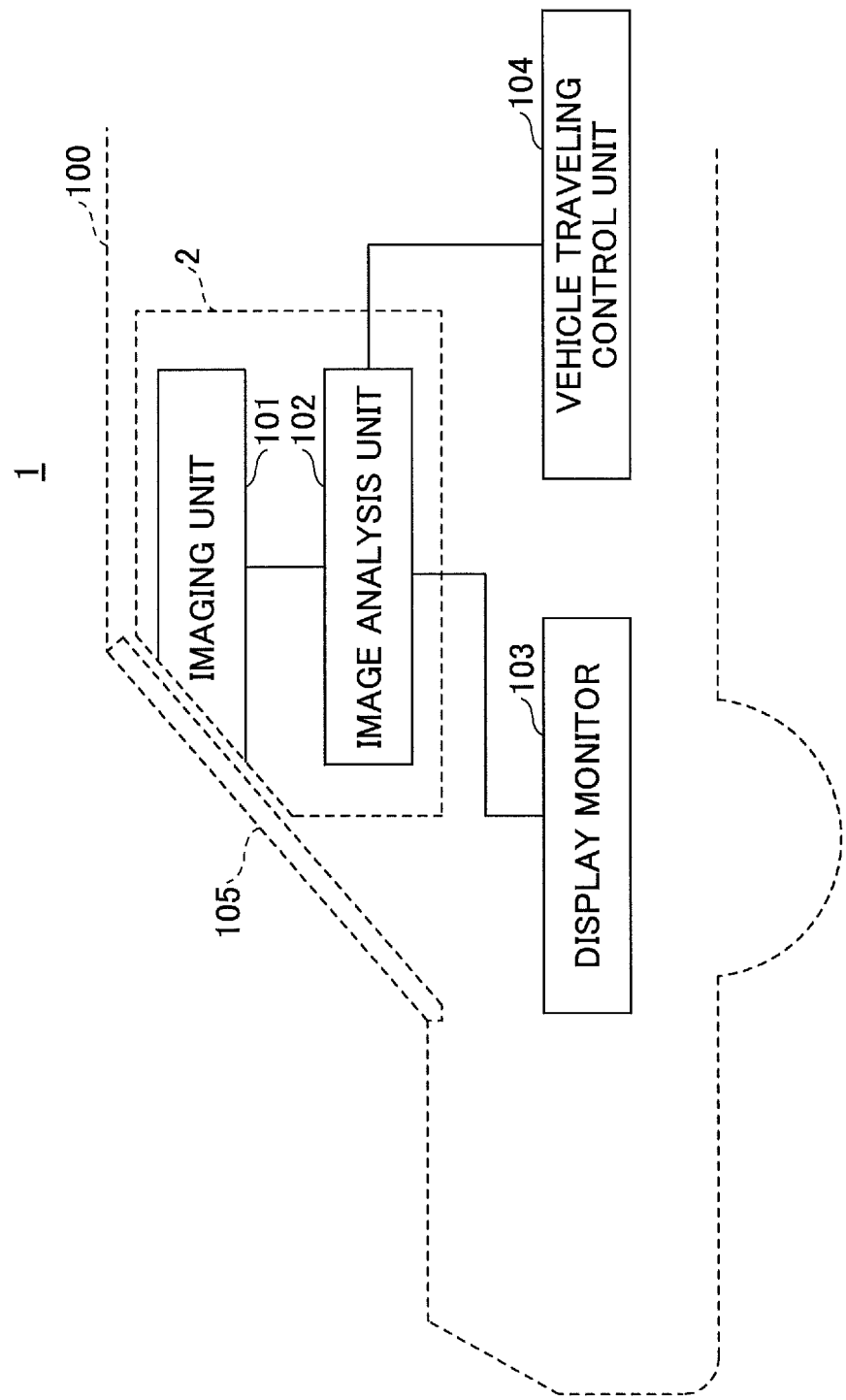
FIG. 1 is a drawing illustrating a structure of a device control system according to an embodiment of the present invention.

FIG. 1 is a drawing illustrating a structure of a device control system 1 according to an embodiment of the present invention.

The device control system 1 is mounted on an automotive vehicle 100 including a car as a moving body. The device control system 1 includes an imaging unit 101, an image analysis unit 102, a display monitor 103, and a vehicle traveling control unit 104. Further, the imaging unit 101 detects an object ahead of the vehicle 100 based on a plurality of captured image data (frames) obtained by capturing images of a forward region (imaging region) of the moving body in a vehicle traveling direction, tracks the object, and performs controlling the moving body and various in-vehicle devices by utilizing the tracking results. The control of the moving body includes, for example, sending a notification of warning, controlling a steering wheel of the vehicle 100 (the moving body), and controlling brakes on the vehicle 100 (the moving body).

The imaging unit 101 is disposed, for example, in the vicinity of a room mirror (not illustrated) at a windshield 105 of the vehicle 100. Various data pieces including the captured image data obtained by the imaging unit 101 are input to the image analysis unit 102.

The image analysis unit 102 analyzes the data received from the imaging unit 101, detects a relative height (position information) of each of respective points on the traveling road surface ahead of the vehicle 100 with respect to the road surface portion (located directly below the vehicle 100) on which the vehicle 100 is running, and determines the 3-D (three-dimensional) profile of the traveling road surface ahead of the vehicle 100. Further, the image analysis unit 102 recognizes a recognition target object including another vehicle, a pedestrian, and various obstacles ahead of the vehicle 100.

The analysis result of the image analysis unit 102 is transmitted to the display monitor 103 and the vehicle traveling control unit 104. The display monitor 103 displays the captured image data obtained by the imaging unit 101 and the analysis result. It should be noted that the display monitor 103 may not be included. The vehicle traveling control unit 104 performs traveling support control including, for example, providing a notification of warning to a driver of the vehicle 100, controlling the steering wheel of the vehicle 100, and controlling brakes on the vehicle 100 based on the recognition result, by the image analysis unit 102, of the recognition target objects including another vehicle, a pedestrian, and various obstacles ahead of the vehicle 100.

(Structures of Imaging Unit 101 and Image Analysis Unit 102)

Figure 2:
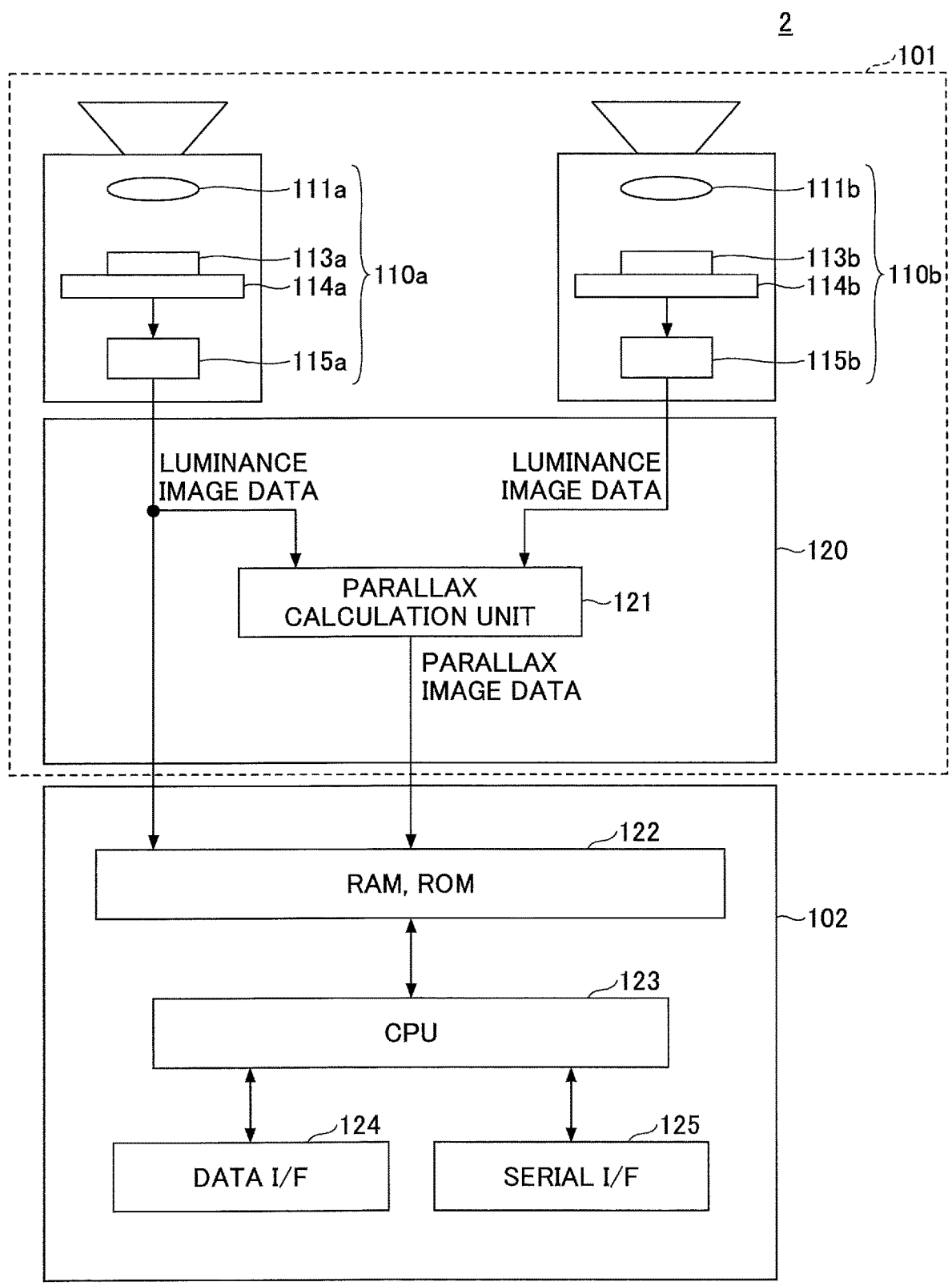
FIG. 2 is a drawing illustrating structures of an imaging unit and an image analysis unit according to an embodiment of the present invention.

FIG. 2 is a drawing illustrating structures of an imaging unit 101 and an image analysis unit 102 according to an embodiment of the present invention.

The imaging unit 101 includes a stereo camera having a pair of imaging units 110a and 110b as imaging means. The imaging units 110a and 110b are identical. The imaging unit 110a/110b includes an imaging lens 111a/111b, a sensor substrate 114a/114b including an image sensor 113a/113b in which light receiving elements are arrayed in a two-dimensional formation, and a signal processing unit 115a/115b that converts an analog electric signal output from the sensor substrate 114a/114b (an electric signal corresponding to light receiving amount received by the light receiving elements on the image sensor 113a/113b) to a digital electric signal, generates the captured image data from the digital electric signal, and outputs the captured image data. Luminance image data and parallax image data are output from the imaging unit 101.

Further, the imaging unit 101 includes a processing hardware unit 120 including a FPGA (Field-Programmable Gate Array), etc. The processing hardware unit 120 includes a parallax calculation unit 121 as a parallax image information generation means that calculates parallax values of corresponding image portions between the captured images captured by the imaging units 110a and 110b in order to obtain a parallax image from the luminance image data sets output from the imaging units 110a and 110b.

Here, one of the captured images obtained by the imaging units 110a and 110b is regarded as a reference image and the other of the captured images is regarded as a comparison image. An amount of positional deviation of an image portion in the comparison image from an image portion in the reference image, both the image portions corresponding to the same point in an imaging region, is calculated as the parallax value of the image portions. By utilizing the principle of triangulation, a distance to the same point in the imaging region corresponding to the image portions can be calculated based on the parallax value of the image portion.

Figure 3:
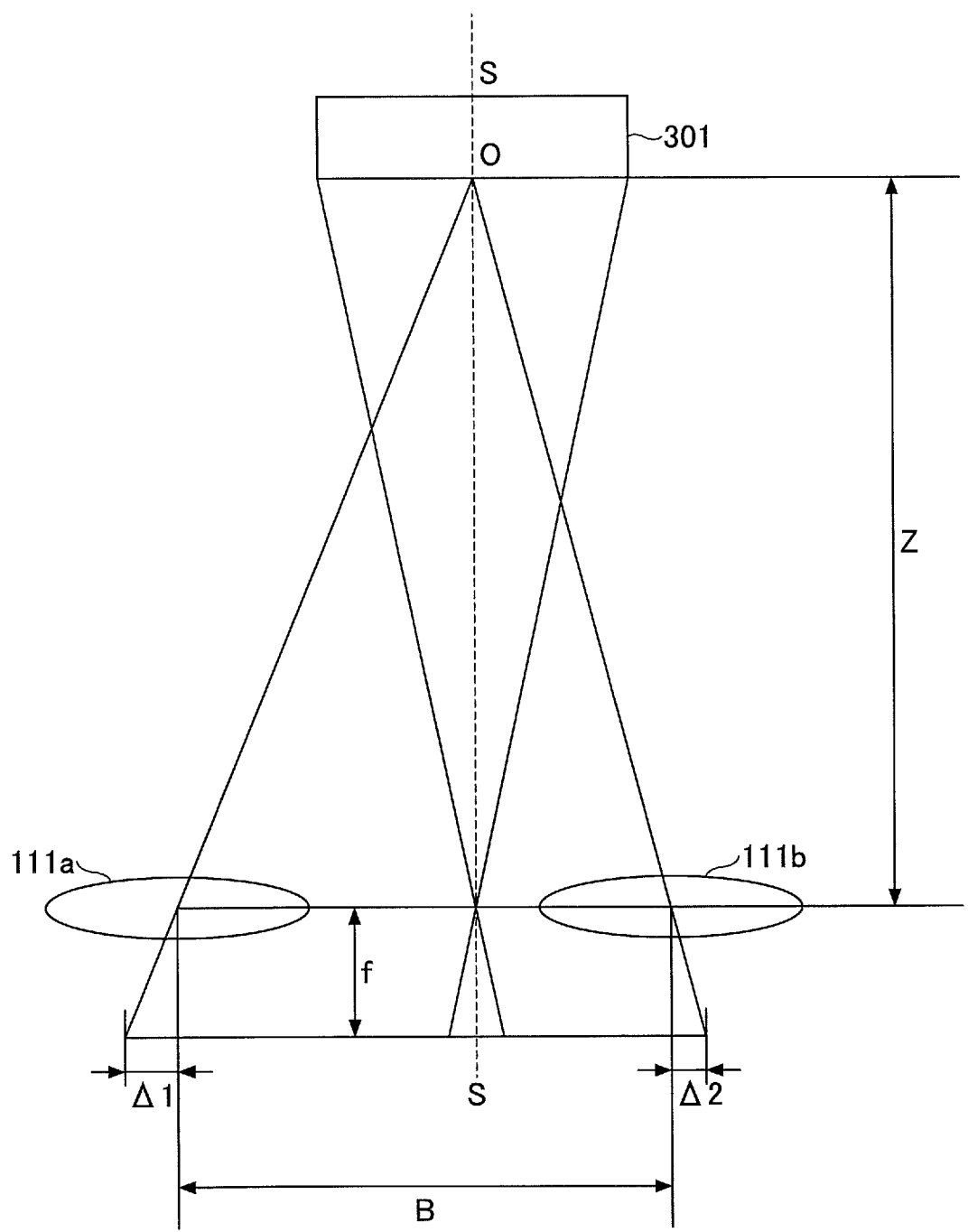
FIG. 3 is a drawing illustrating a principle for calculating a distance from a parallax value by using the principle of triangulation.

FIG. 3 is a drawing illustrating a principle for calculating a distance from a parallax value by using the principle of triangulation. In FIG. 3, "f" denotes a focal distance of each of the imaging lenses 111a and 111b, "B" denotes a distance between optical axes of the imaging lenses 111a and 111b, and "Z" denotes a distance from the imaging lenses 111a and 111b to a subject 301 (a distance in a direction parallel to the direction of the optical axes). As illustrated in FIG. 3, a distance of an image formation position of a left image with respect to a point O on the subject 301 from an image formation center thereof is $\Delta 1$, and a distance of an image formation position of a right image with respect to the point O on the subject 301 from the image formation center thereof is $\Delta 2$. At this time, the parallax value d can be defined by $d=\Delta 1+\Delta 2$.

Referring back to FIG. 2, the image analysis unit 102 is formed on an image processing board or the like. The image analysis unit 102 includes a memory unit 122 that is implemented by a RAM, a ROM, or the like, and stores the luminance image data and the parallax image data output from the imaging unit 101. The image analysis unit 102 further includes a CPU (Central Processing Unit) 123, a data I/F (interface) 124, and a serial I/F 125. The CPU 123 executes computer programs for performing a recognition process of a recognition target and a parallax calculation control.

The FPGA, which is included in the processing hardware unit 120, generates parallax image information by performing processes that require real-time processing of image data, such as gamma correction, distortion correction (collimation of left and right captured images), and parallax calculation by using block matching. The FPGA stores the generated parallax image information in the RAM of the image analysis unit 102. The CPU of the image analysis unit 102 controls operations of image sensor controllers of the imaging units 110A and 110B, and controls overall operations of the image processing board. Further, the CPU of the image analysis unit 102 reads, from the ROM, computer programs for performing processes including a 3-D profile detection process related to a road surface and an object detection process related to a guardrail or the like, performs the processes by using, as inputs, the luminance image data and the parallax image data stored in the RAM, and outputs results of the processes to an external device via the data I/F 124 or the serial I/F 125. When the above processes are performed, the CPU of the image analysis unit 102 may receive vehicle operation information including a vehicle speed, an acceleration (mainly, a forward/backward acceleration), a steering angle, a yaw rate, or the like via the data I/F 124, and use the vehicle operation information as a parameter of the above processes. The data output to the external device is used by an external device as input data for controlling the various devices of the vehicle 100 (brake control, speed control, warning control, etc.).

It should be noted that the imaging unit 101 and the image analysis unit 102 may be implemented as a single imaging device 2.

<Object Detection Process>

Figure 4:
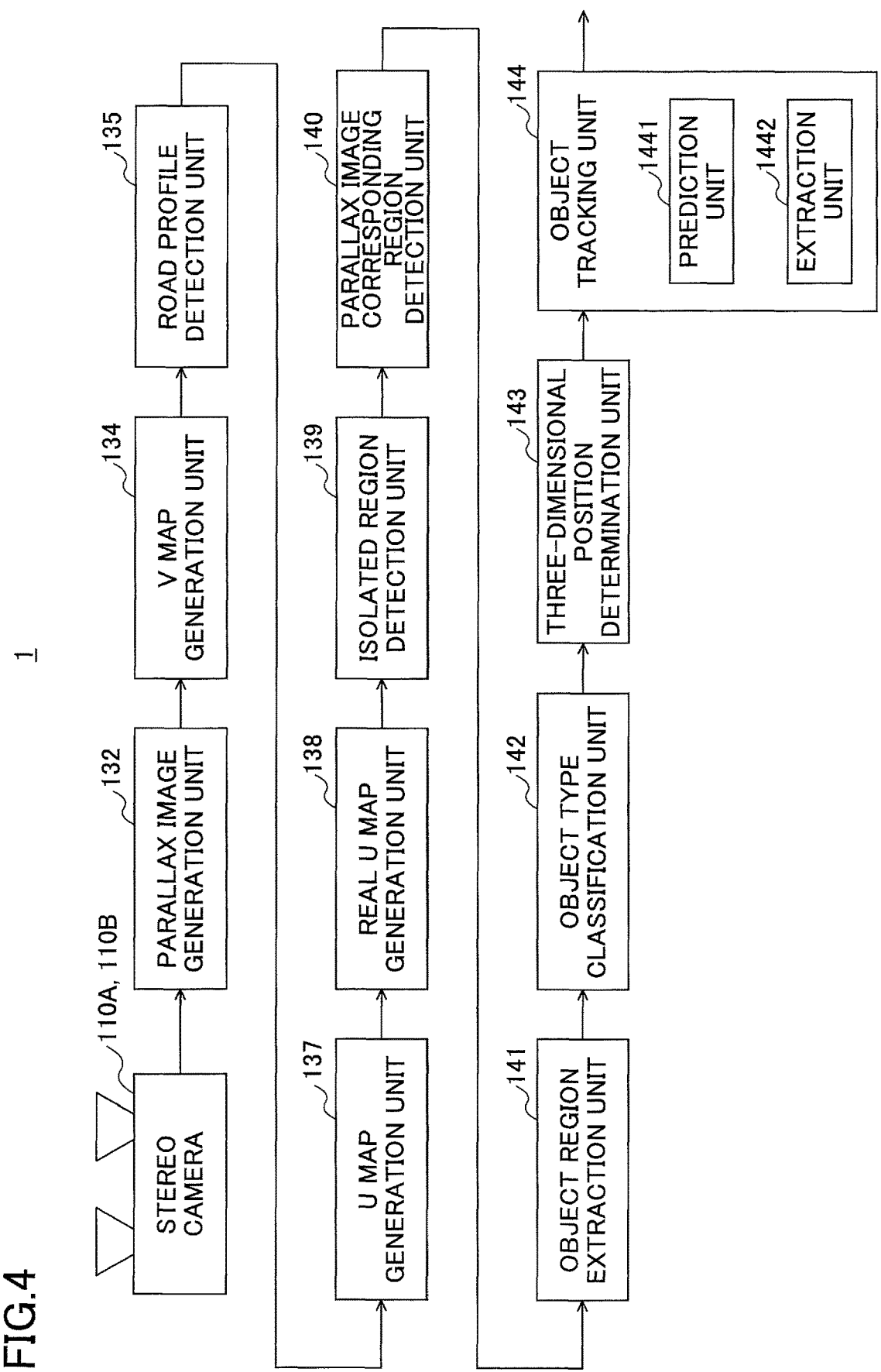
FIG. 4 is a drawing illustrating an example of a functional block diagram of the device control system.

Next, referring to FIG. 4, an object detection process performed by the processing hardware unit 120 and the image analysis unit 102 in FIG. 2 will be described. FIG. 4 is a drawing illustrating an example of a functional block diagram of the device control system 1. In the following, the object detection process according to an embodiment of the present invention will be described.

The imaging units 110a and 110b, which constitute the stereo camera, output the luminance image data. At this time, in a case where the imaging units 110a and 110b capture color images, the imaging units 110a and 110b perform color luminance conversion to obtain a luminance signal (Y) from RGB signals of the color images by using, for example, the following formula [1].

$$Y=0.3R+0.59G+0.11B \qquad \text{Formula [1]}$$

<Parallax Image Generation Process>

Next, a parallax image generation unit 132, which includes the parallax calculation unit 121, performs a parallax image generation process for generating the parallax image data (the parallax image information, or an example of "information in which a position of a detection target object in a vertical direction, a position in a horizontal direction, and a position in a depth direction are associated with each other"). In the parallax image generation process, the luminance image data of the imaging unit 110a that is one of the imaging units 110a and 110b is regarded as reference image data, and the luminance image data of the imaging unit 110b that is the other of the imaging units 110a and 100b is regarded as comparison image data. In the parallax image generation process, parallax image data is generated by calculating parallax values between the reference image data and the comparison image data, and the generated parallax image data is output. The parallax image data indicates a parallax image in which a pixel value according to the parallax value d calculated with respect to each of image portions of the reference image data is represented as a pixel value of the corresponding image portion.

<<V Map Generation Process>>

Next, a V map generation unit 134 performs a V map generation process in which the parallax image data is obtained from the parallax image generation unit 132 and a V map is generated. Each of parallax pixel data items included in the parallax image data is represented by a set (x, y, d) in which x denotes a position in x-axis direction, y denotes a position in y-axis direction, and d denotes a parallax value. Parallax histogram information is generated by transforming the set (x, y, d) to three-dimensional coordinate information (d, y, f) as the parallax histogram information in which d is set in X-axis, y is set in Y-axis, and a frequency f is set in Z-axis. The three-dimensional coordinate information (d, y, f) may be limited to the three-dimensional coordinate information (d, y, f) which exceeds a predetermined frequency threshold. The parallax histogram information according to an embodiment of the present invention includes three dimensional coordinate information (d, y, f). A map in which the three-dimensional histogram information is distributed in the X-Y two-dimensional coordinate system is referred to as a V map (parallax histogram map, V-parallax map, or V-disparity map).

Specifically, the V map generation unit 134 calculates a parallax value frequency distribution for each of parallax image data line regions obtained by dividing the image in the up-down direction. Information indicating the above-described parallax value frequency distribution calculated by the V map generation unit 134 is the parallax histogram information.

Figure 5A:
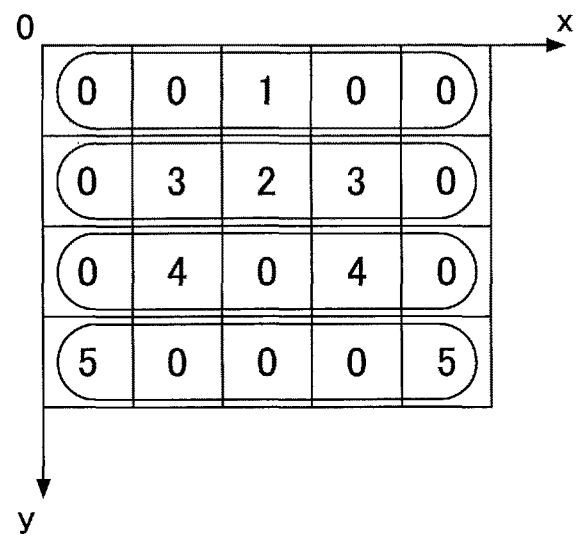
FIGS. 5A-5B are drawings illustrating parallax image data and a V map generated from the parallax image data.
Figure 5B:
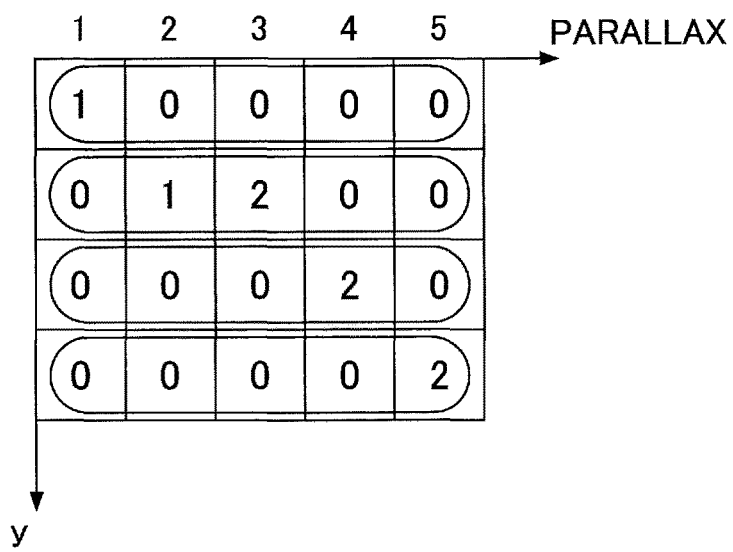

FIGS. 5A-5B are drawings illustrating the parallax image data and a V map generated from the parallax image data. Here, FIG. 5A is a drawing illustrating an example of a parallax value distribution of the parallax image, and FIG. 5B is a V map illustrating a parallax value frequency distribution for each of the parallax image lines of FIG. 5A.

When the parallax image data having a parallax value distribution as illustrated in FIG. 5A is input (is received), the V map generation unit 134 calculates the parallax value frequency distribution which indicates a distribution of the number of data items of the parallax value for each of the lines, and outputs the calculated parallax value frequency distribution as the parallax histogram information. The information of the parallax value frequency distribution for each of the lines is expressed in the two-dimensional orthogonal coordinate system in which the position in the y-axis direction of the parallax image (or the position in the up-down direction of the captured image) is assigned to the Y-axis and the parallax value is assigned to the X-axis. In this way, the V map as illustrated in FIG. 5B can be obtained. This V map may also be expressed as an image in which pixels each having a pixel value according to the frequency f are distributed in the two-dimensional orthogonal coordinate system.

Figure 6A:
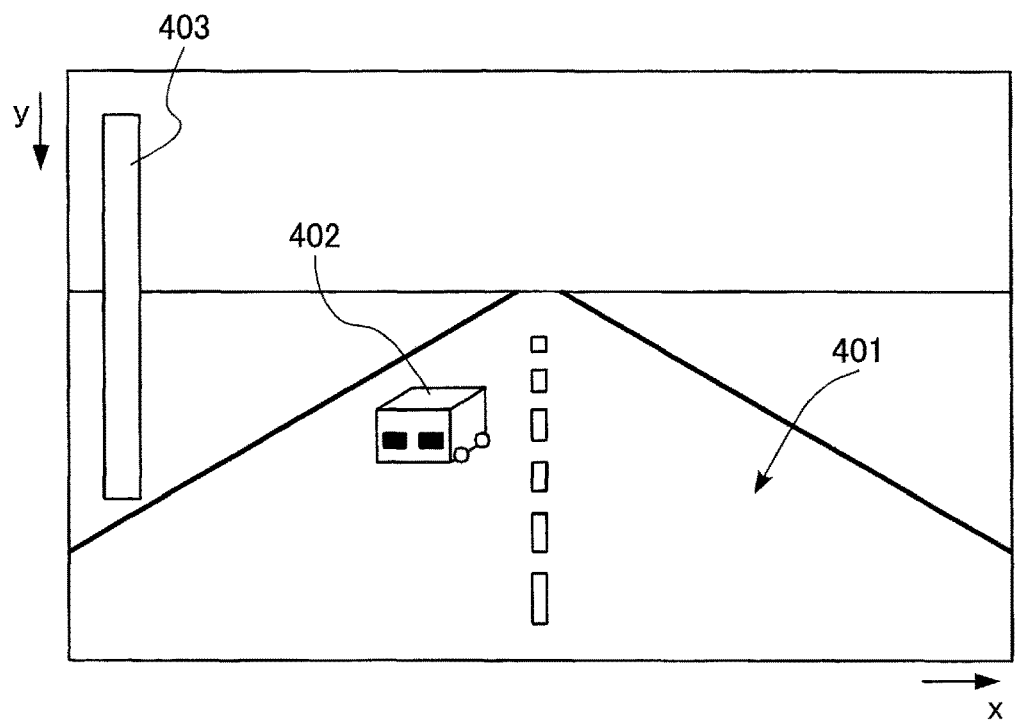
FIGS. 6A-6B are drawings illustrating an image example of a captured image as a reference image captured by one of imaging units, and a V map corresponding to the captured image.
Figure 6B:
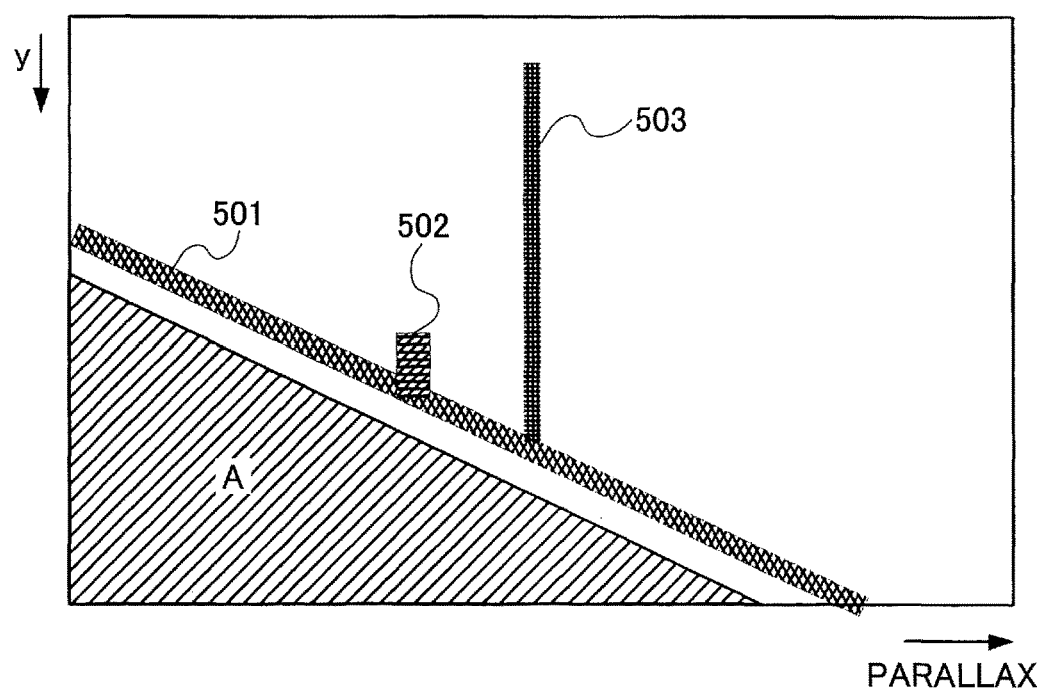

FIGS. 6A-6B are drawings illustrating an image example of a captured image as a reference image captured by one of the imaging units, and a V map corresponding to the captured image. Here, FIG. 6A illustrates the captured image and FIG. 6B illustrates the V map. The V map illustrated in FIG. 6B is generated based on the captured image illustrated in FIG. 6A.

In the image example of FIG. 6A, a road surface 401 on which the vehicle is running, a preceding vehicle 402 existing ahead of the vehicle, and an electric pole 403 existing outside the road surface are illustrated. Further, in the V map of FIG. 6B, a road surface 501, a preceding vehicle 502, and an electric pole 503, which correspond to elements of the image example, are illustrated.

<<Road Surface Profile Detection Process>>

Next, in an embodiment of the present invention, a road surface profile detection unit 135 performs a road surface profile detection process for detecting a three-dimensional profile of a road surface ahead of the vehicle 100 based on the V map information (parallax histogram information) generated by the V map generation unit 134.

The image example illustrated in FIG. 6A is obtained in a case where the road surface ahead of the vehicle 100 is a flat road surface (i.e., the road surface ahead of the vehicle 100 is consistent with a virtual reference road surface (virtual reference moving surface) obtained by extending, in the vehicle forward direction, a road surface parallel to a road surface portion right below the vehicle 100). In this case, the points with a high frequency (road surface 501) in the lower portion of the V map corresponding to the lower portion of the image are distributed along an approximately straight line having an inclination in which the parallax value d decreases toward the upper portion of the image. It can be understood that the pixels indicating the above-described distribution are obtained when an image of a target object, which exists substantially at the same distance in each line of the parallax image and has the highest occupancy rate with the distance continuously increasing toward the upper portion of the image, is captured.

The imaging unit 110a captures an image of a region ahead of the vehicle, and the content of the captured image indicates that the parallax value d of the road surface decreases toward the upper portion of the image as illustrated in FIG. 6B. Further, the pixels indicating the road surface have substantially the same parallax value d in the same line (horizontal line). Therefore, the points with a high frequency distributed along the approximately straight line in the V map (road surface 501) correspond to the feature of the pixels indicating the road surface (moving surface). Thus, the pixels of the points, which are distributed on an approximate line obtained by performing linear approximation of the points with a high frequency of the V map or distributed in the vicinity of the approximate line, can be estimated as the pixels indicating the road surface with high accuracy. Further, a distance to a road surface portion indicated by each of the pixels can be calculated with high accuracy based on the parallax value d of the corresponding point on the approximate line. It should be noted that a height of the road surface can be calculated from the estimation of the road surface, and thus, a height of an object on the road surface can be calculated. The height of an object on the road surface can be calculated by using a known method. For example, after determining a line formula representing the estimated road surface, it is assumed that a corresponding y coordinate y0 when the parallax value d=0 is the height of the road surface. In the case, for example, where the parallax value is d and a y coordinate is y', y'−y0 indicates the height of the road surface when the parallax value is d. The height H of the above-described coordinates (d, y') from the road surface can be calculated by using an arithmetic expression $H=(z*(y'-y0))/f$. It should be noted that "z" in the above arithmetic expression denotes a distance calculated from the parallax value d ($z=BF/(d-offset)$), and "f" is a value obtained by converting a focal distance of the imaging units 110a and 110b to the same unit as that of (y'−y0). Here, "BF" is a value obtained by multiplying a baseline length B, which is a length between the imaging units 110a and 110b, by the focal distance f, and "offset" is a parallax value obtained from a captured image of an object located at infinity.

<<U Map Generation Process>>

Next, a U map generation unit 137 performs, as a U map generation process for generating a U map (U-disparity map, or, U-parallax map), a frequency U map generation process and a height U map generation process.

In the frequency U map generation process, the U map generation unit 137 generates X-Y two-dimensional histogram information from the set (x, y, d), in which x is a x-axis direction position, y is a y-axis direction position, and d is a parallax value for each of the parallax pixel data items included in the parallax image data, by setting x in X-axis, d in Y-axis, and the frequency in Z-axis. This X-Y two-dimensional histogram information is referred to as a frequency U map. The U map generation unit 137 according to the present embodiment generates a frequency U map only for the points (x, y, d) of the parallax image whose heights H from the road surface are in a predetermined range (e.g., from 20 cm to 3 m). In this case, it is possible to appropriately extract an object that exists in the predetermined height range from the road surface.

Further, in the height U map generation process, the U map generation unit 137 generates X-Y two-dimensional histogram information from the set (x, y, d), in which x is a x-axis direction position, y is a y-axis direction position, and d is a parallax value for each of the parallax pixel data items included in the parallax image data, by setting x in X-axis, d in Y-axis, and the height from the road surface in Z-axis. This X-Y two-dimensional histogram information is referred to as a height U map. The value of the height at this time is the highest height from the road surface.

Figure 7:
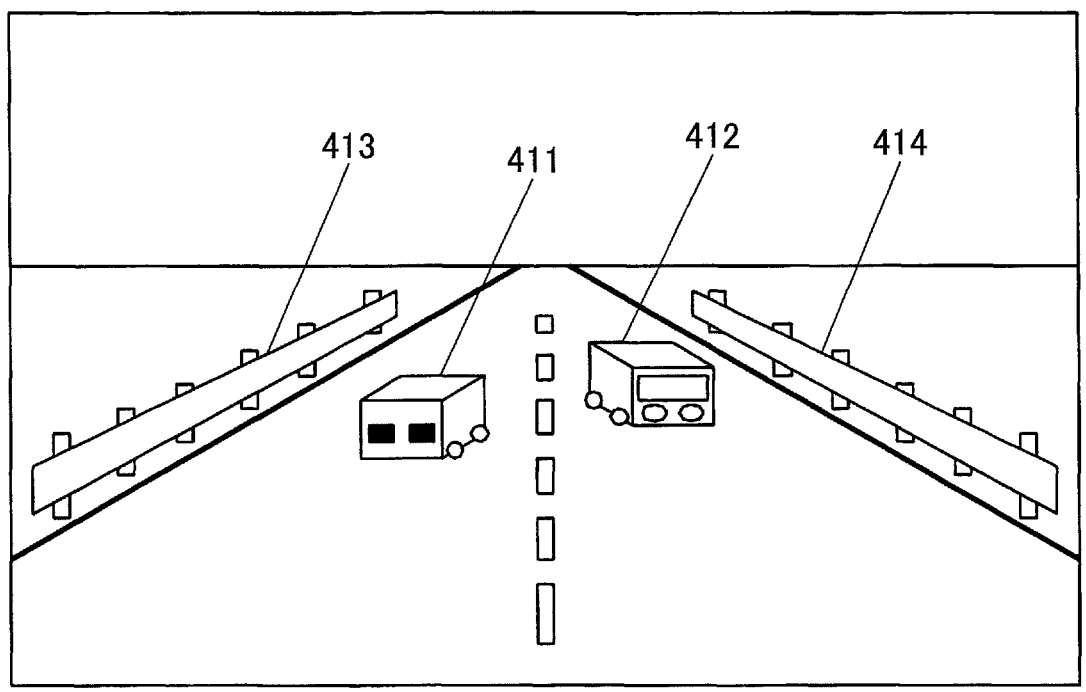
FIG. 7 is an image example in which an example of the reference image is schematically illustrated.
Figure 8A:
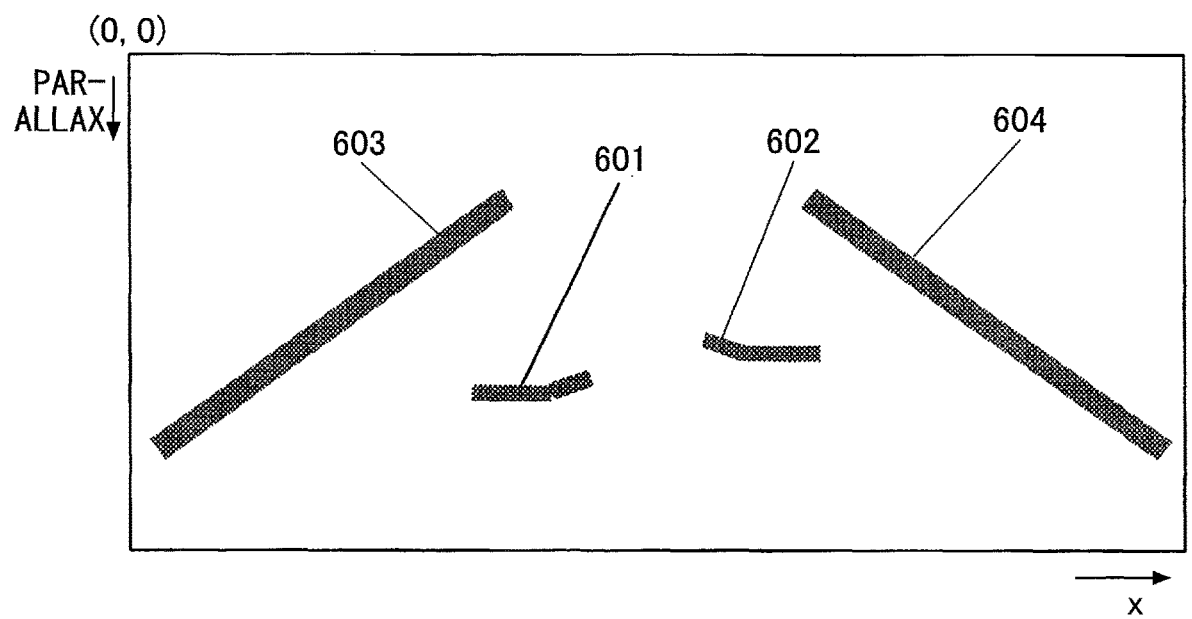
FIGS. 8A-8B are drawings illustrating U maps corresponding to the image example.
Figure 8B:
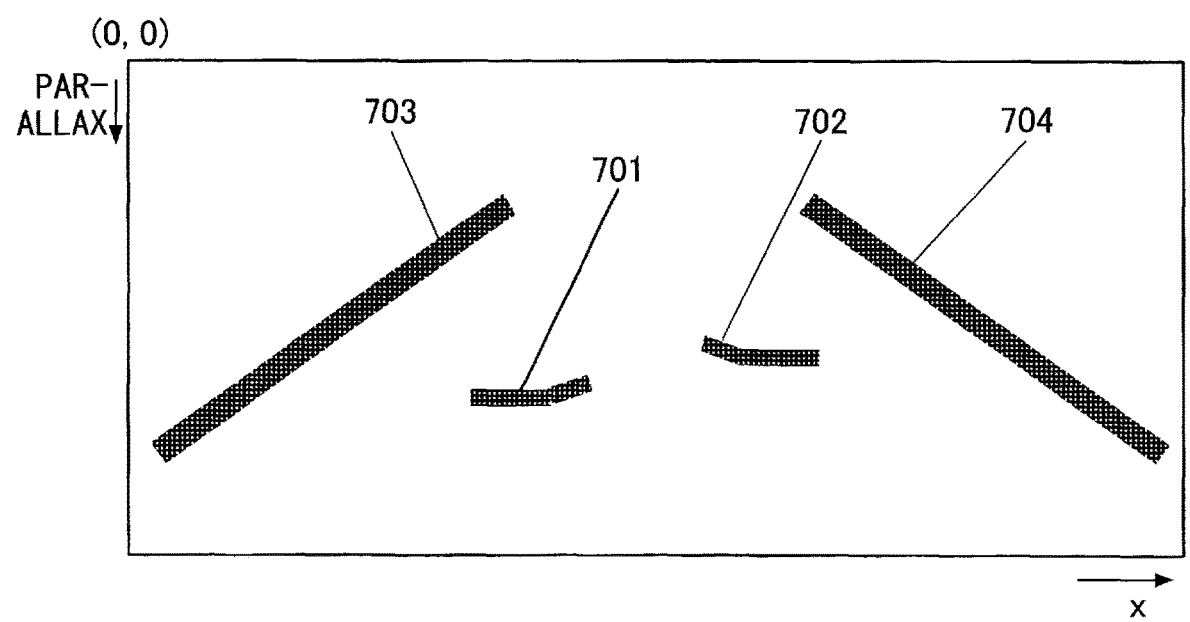

FIG. 7 is a schematic image example of a reference image obtained by the imaging unit 110a, and FIGS. 8A-8B are U maps corresponding to the image example of FIG. 7. Here, FIG. 8A is a frequency U map and FIG. 8B is a height U map.

In the image example illustrated in FIG. 7, there exist guardrails 413 and 424 on left side and right side of the road surface, and there exist two other vehicles, a preceding vehicle 411 and an oncoming vehicle 412. At this time, in the frequency U map, as illustrated in FIG. 8A, the points of high frequency corresponding to the left and right guardrails 413 and 414 are distributed along approximately straight lines 603 and 604 which extend upward to the central portion from the left end portion and the right end portion. On the other hand, the points of high frequency corresponding to the preceding vehicle 411 and the oncoming vehicle 412 are distributed along line segments 601 and 602 which extend approximately in parallel with the x-axis direction between the left and right guardrails. It should be noted that, in a case where other portions of these vehicles 411 and 412 different from the rear portion of the preceding vehicle 411 and the front portion of the oncoming vehicle 412 are captured, parallax arises within an imaging region in which these vehicles are captured. In this case, as illustrated in FIG. 8A, the points of high frequency corresponding to these vehicles are distributed along parallel line segments extending approximately in parallel with the x-axis direction and along slanting line segments that are slanting to the x-axis direction and connected to the parallel line segments.

Further, in the height U map, the points of the greatest height from the road surface corresponding to the left and right guardrails 413 and 414, the preceding vehicle 411, and the oncoming vehicle 412 are distributed in a manner similar to the frequency U map. Here, the height of a distribution 701 of points corresponding to the preceding vehicle and a distribution 702 of points corresponding to the oncoming vehicle is higher than the height of distributions 703 and 704 of points corresponding to the guardrails. Thereby, the height information of objects in the height U map can be used for the object detection.

<<Real U Map Generation Process>>

Next, a real U map generation unit 138 will be described. The real U map generation unit 138 performs, as a real U map generation process for generating a real U map (Real U-disparity map, or, Real U-parallax map) (an example of "distribution data"), a real frequency U map generation process and a real height U map generation process.

The real U map is generated by transforming each of the pixels of the image along the horizontal axis of the U map into an actual distance and by transforming a parallax value along the vertical axis into a thin-out (extracted) parallax having a thin-out (extraction) rate according to the distance.

In the real frequency U map generation process, the real U map generation unit 138 generates X-Y two-dimensional histogram information based on the set (x, y, d), in which x is a x-axis direction position, y is a y-axis direction position, and d is a parallax value for each of the parallax pixel data items included in the parallax image data, by setting the actual distance in the horizontal direction in X-axis, the thin-out parallax in Y-axis, and the frequency in Z-axis. It should be noted that, similar to the U map generation unit 137, the real U map generation unit 138 according to the present embodiment generates a real frequency U map only for the points (x, y, d) of the parallax image whose heights H from the road surface are in a predetermined range. It should be noted that the real U map generation unit 138 may generate the real U map based on the U map generated by the U map generation unit 137.

Figure 9:
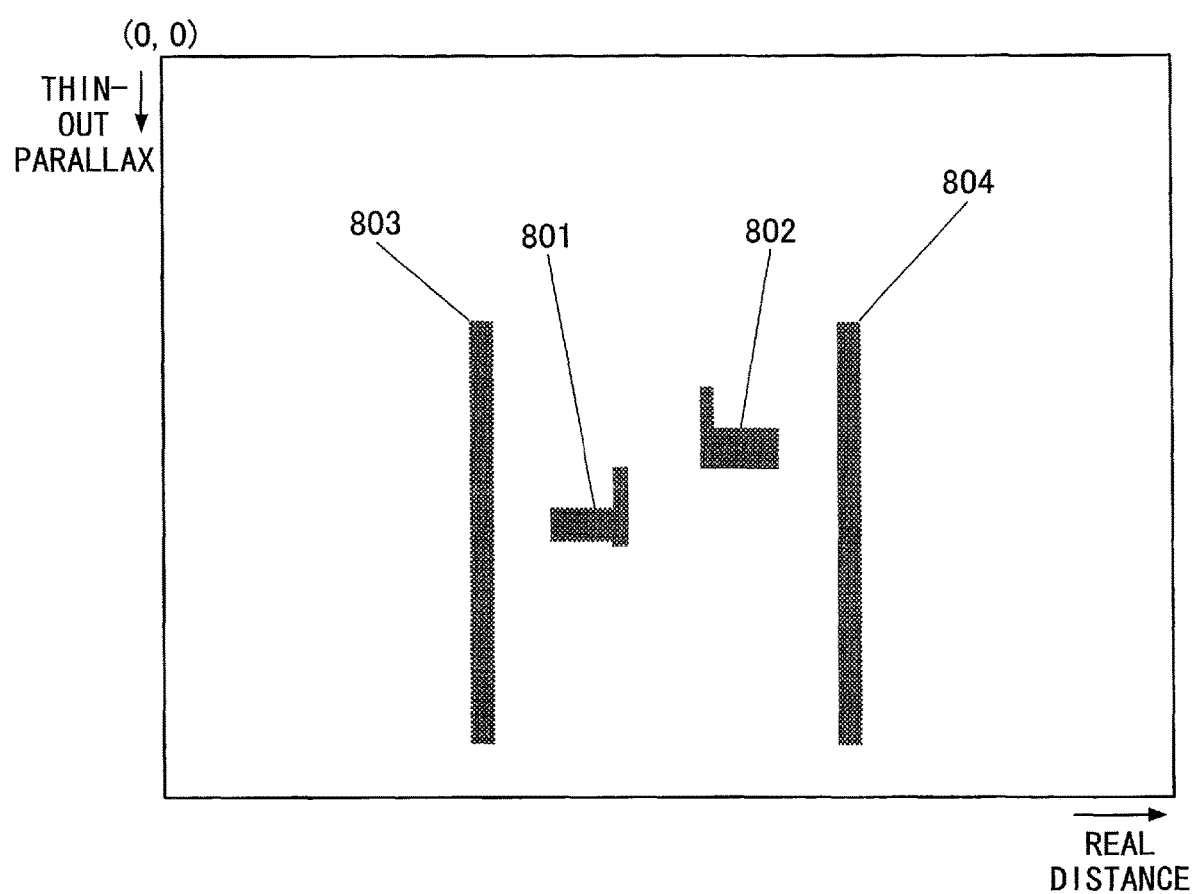
FIG. 9 is a drawing illustrating a real U map corresponding to the U map.

FIG. 9 is a drawing illustrating a real U map corresponding to the frequency U map illustrated in FIG. 8A (hereinafter, referred to as "real frequency U map"). As illustrated in FIG. 9, the left and right guardrails are expressed by vertical linear patterns 803 and 804 and the preceding vehicle and the oncoming vehicle are also expressed by patterns 801 and 803 which are similar to their actual shapes.

The thin-out (extracted) parallax of the vertical axis is defined such that no thin-out is applied to the long distance (50 m or more), ½ thin-out is applied to the medium distance (20 m or more and less than 50 m), ⅓ thin-out is applied to the short distance (10 m or more and less than 20 m), and ⅛ thin-out is applied to the very short distance (less than 10 m).

In other words, the thin-out amount decreases as the distance increases. The reason for the above arrangement is as follows. An image of an object at a long distance is small, the amount of the parallax data is small, and the distance resolution is low, and thus, the thin-out amount is decreased. Conversely, an image of an object at a short distance is great, the amount of the parallax data is great, and the distance resolution is high, and thus, the thin-out amount is increased.

A method of transforming the pixels of an image along the horizontal axis into the actual distance, i.e., an example of a method of determining (X, d) of the real U map from (x, d) of the U map will be described while making reference to FIG. 10.

A width between a left position and a right position both at a distance of 10 m from the camera, i.e., a width of 20 m, is set as an object detection range. When it is assumed that the width of one pixel in the lateral direction of the real U map is equal to 10 cm, the lateral direction size of the real U map corresponds to the width of 200 pixels.

Figure 10:
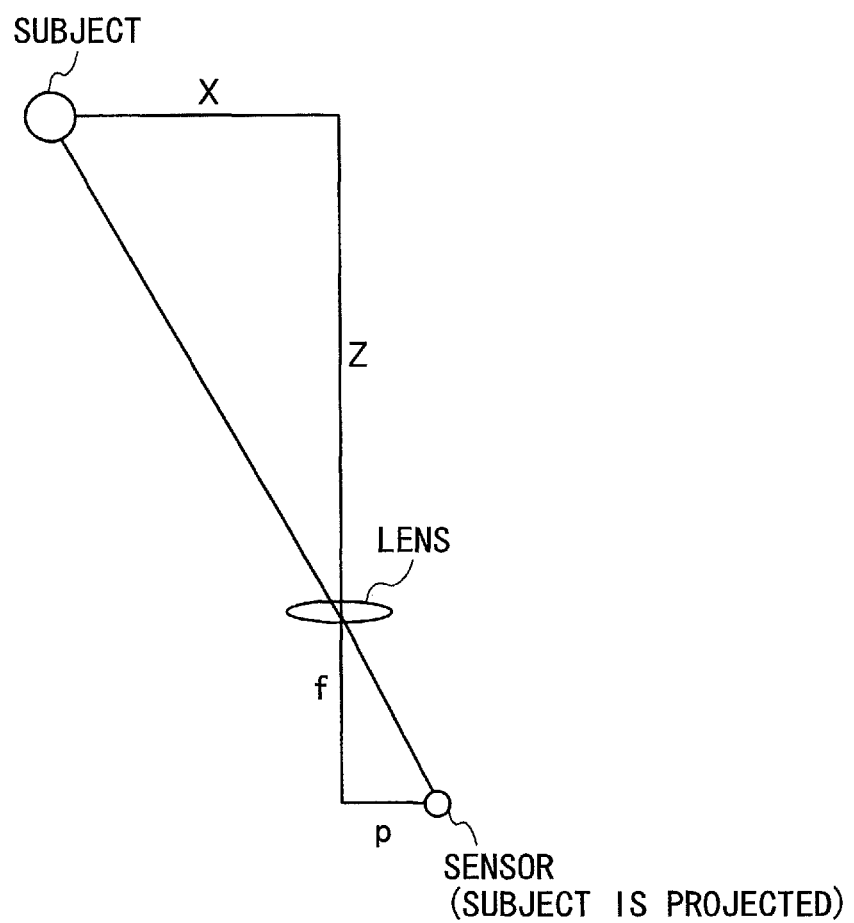
FIG. 10 is a drawing illustrating a method for obtaining a horizontal axis value in the real U map from a horizontal axis value in the U map.

In FIG. 10, "f" denotes the focal distance of the camera, "p" denotes the position of the sensor in the lateral direction from the camera center, "Z" denotes the distance from the camera to the subject, and "X" denotes the position of the subject in the lateral direction from the camera center. When it is assumed that "s" denotes the pixel size of the sensor, the relationship between "x" and "p" is expressed by "x=p/s". Further, the equation "Z=Bf/d" holds from the characteristics of the stereo camera.

Further, as illustrated in FIG. 10, the equation "X=p*Z/f" holds, and thus, "X" can be expressed by the equation "X=s×B/d". "X" denotes the real distance. Because the width of one pixel in the lateral direction of the real U map is equal to 10 cm, the position X in the real U map can be easily calculated.

A real U map corresponding to the height U map illustrated in FIG. 8B (hereinafter, referred to as real height U map) can also be generated by using the same procedure.

The real U map has a height in the lateral or vertical direction smaller than that of the U map, and allows high speed processing. Further, the real U map in the lateral direction does not depend on the distance, and the same object can be detected with the same width regardless of the distance (regardless whether it is a far distance or a near distance). This allows the subsequent processes of peripheral region removal and determination as to horizontal separation or vertical separation (width threshold processing) to become simpler.

The length of the U map in the vertical direction is determined by determining the measurable smallest distance. In other words, because "d=Bf/Z", the maximum value of d is determined according to the measurable smallest value of Z. Further, usually, the parallax value d is calculated in units of pixels when a stereo image is processed. However, the parallax value d includes a decimal portion. Therefore, the parallax value is multiplied by a predetermined value, and the decimal portion of the resulting parallax value is rounded off to the nearest integer, and the resulted integer is used.

When the measurable smallest Z becomes a half, the parallax value d is doubled and the data of the U map is greatly increased. Hence, when generating the real U map, a greater thin-out amount is applied to a shorter distance place to compress the data, and the data amount is reduced from the U map.

As a result, it is possible to perform object detection by using labeling with higher speed.

<<Isolated Region Detection>>

Figure 11:
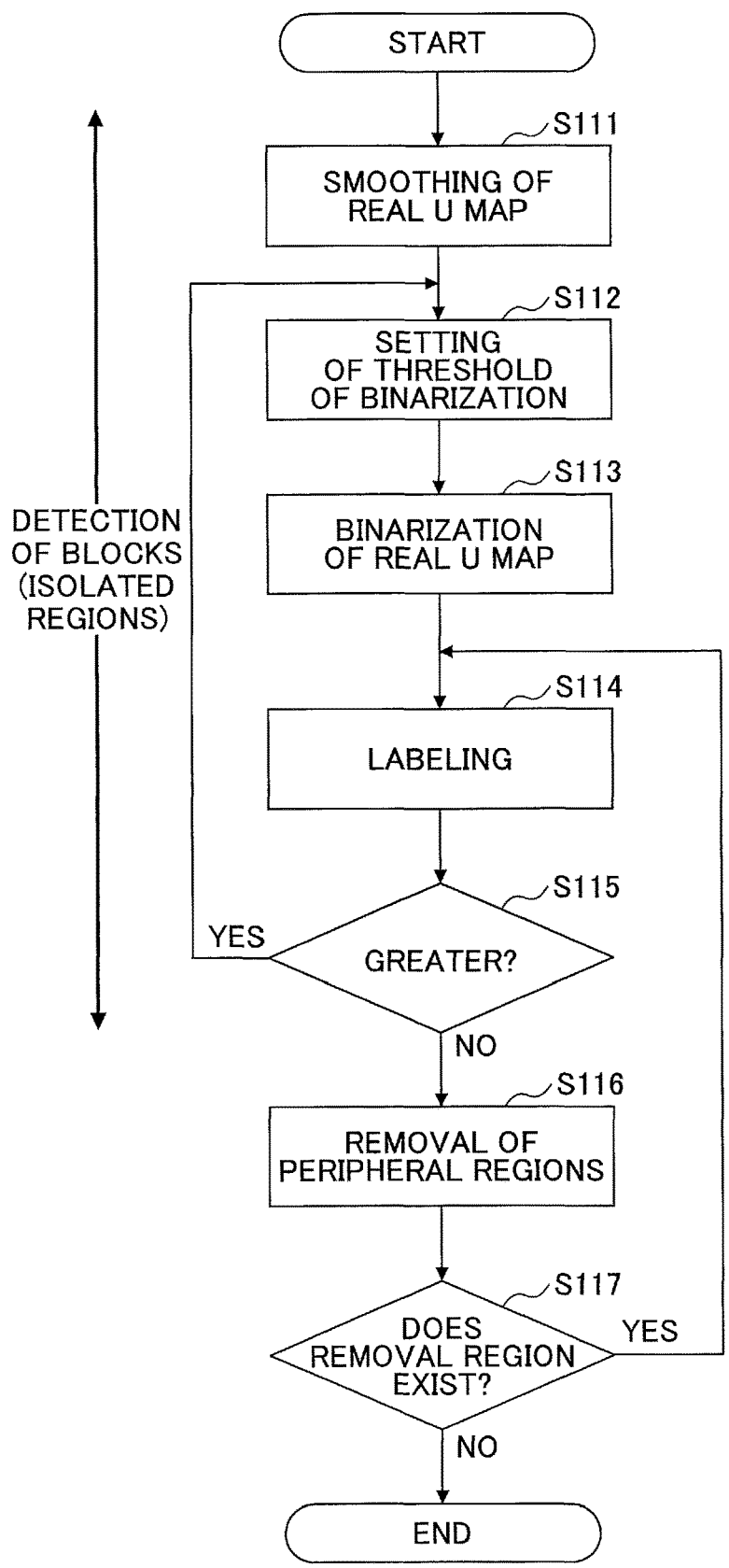
FIG. 11 is a flowchart illustrating an example of an isolated region detecting process.

Next, an isolated region detection process performed by an isolated region detection unit 139 will be described. FIG. 11 is a flowchart illustrating an example of the isolated region detecting process. The isolated region detection unit 139 performs smoothing of the information of the real frequency U map generated by the real U map generation unit 138 (step S111).

The frequency value is averaged in order to facilitate the detection of an effective isolated region. In other words, the parallax value may include a calculation error and the parallax value may not be always calculated for all pixels, and, unlike the drawing illustrated in FIG. 9, the real U map includes noise; therefore, the real U map is smoothed in order to remove the noise and to facilitate the separation of a detection target object; and, similar to the smoothing of an image, a smoothing filter (e.g., 3×3 pixels arithmetic averaging filter) is applied to the frequency value of the real U map (real frequency U map), the frequency which is regarded as the noise can be reduced, and the frequency in the object portion which is greater than that of the peripheral portions can be collected as a group, which will facilitate the subsequent isolated region detection process.

Next, a binarization threshold is set (step S112). Initially, the smoothed real U map is binarized using a small threshold value (=0) (step S113). Then, the labeling of coordinates with a non-zero value as a result of binarization is performed to detect an isolated region (step S114).

In the steps S112 and S114, an isolated region (referred to as an "island"), whose frequency is higher than that of the surroundings in the real frequency U map, is detected. In order to detect an isolated region, the real frequency U map is binarized (step S113). Initially, the binarization is performed by using zero (0) as a threshold value. These steps are performed in order to cope with a case in which there are not only an isolated island but also an island connected to another island due to the objects' height, shape, or separation from the road surface parallax. In other words, by starting the binarization of the real frequency U map with a small threshold value, initially, an isolated island with an appropriate size is detected. Then, by increasing the threshold value, a connected island can be separated into isolated islands with an appropriate size to be detected.

The labeling is used as a method for detecting an island after the binarization. The labeling is applied to coordinates indicating black after the binarization (coordinates whose frequency value is greater than the binarization threshold value) based on the connectivity, and a region with the same label is determined to be an island.

With respect to each of the detected isolated regions, the size of the isolated region is determined (step S115). The above determination is performed because detection targets range from a pedestrian to a large-sized car. It is determined whether the width of the isolated region is in a range of the detection target. If the isolated region is greater than the range of the detection target (step S115: YES), then the binarization threshold value is increased by one (step S112) and the binarization is performed for the isolated region of the real frequency U map (step S113). Further, the labeling is performed to detect a smaller isolated region (step S114), and the size of the region is determined (step S115).

The above processes from the threshold setting to the labeling are repeatedly performed to detect an isolated region of a desired size. If an isolated region of the desired size is detected (step S115: NO), then removal of a peripheral region is performed (step S116). The removal of a peripheral region is a process for removing a region of the left, right or the vicinity of an object whose height is close to the road surface (peripheral part of the isolated region) in the case where the object is at a long distance, the level of accuracy of the road surface detection is low, the parallax of the road surface is introduced to the real U map, and the parallax of the object and the parallax of the road surface are detected as a clump. In the case where there exists a removal region (step S117: YES), the labeling is performed again and an isolated region is set again (step S114).

<<Parallax Image Corresponding Region Detection, and Object Region Extraction>>

Figure 12:
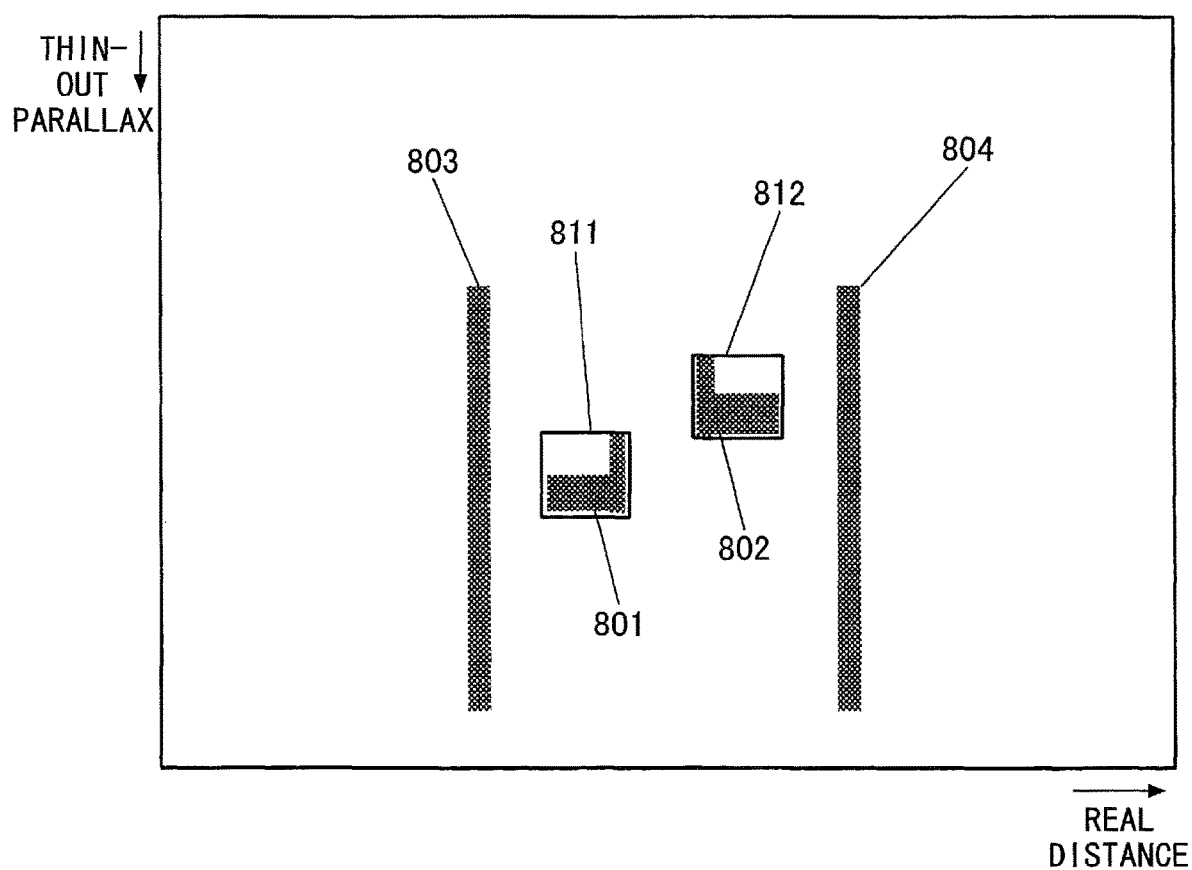
FIG. 12 is a drawing illustrating a real frequency U map in which a rectangle region, by which an isolated region detected by the isolated region detecting process is circumscribed, is set.
Figure 13:
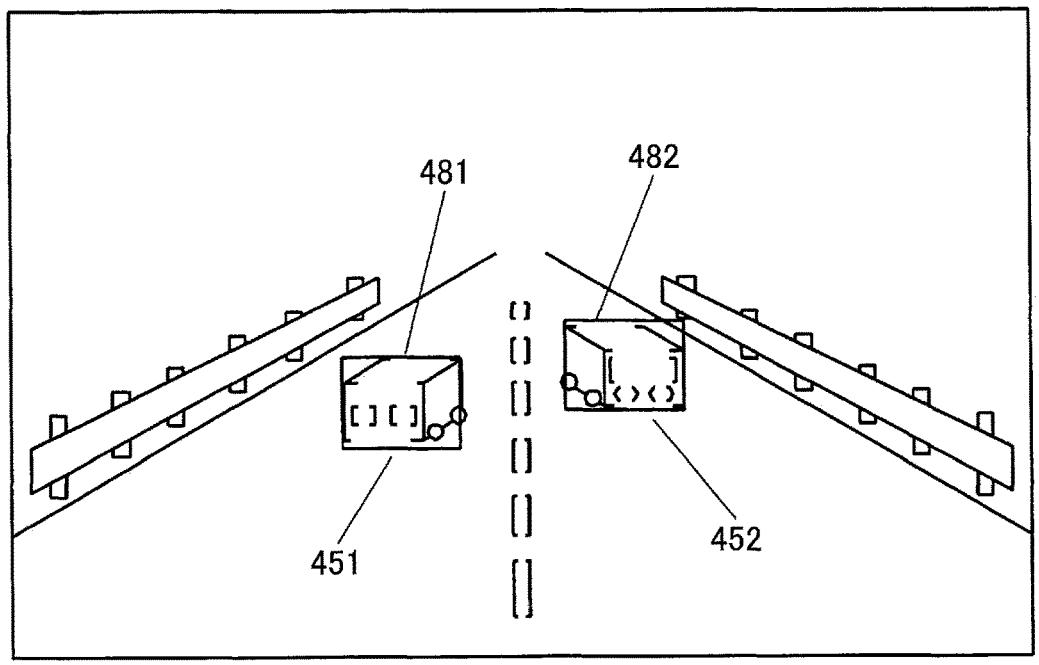
FIG. 13 is a drawing illustrating a parallax image in which a scanning range corresponding to the rectangle region is set.
Figure 14:
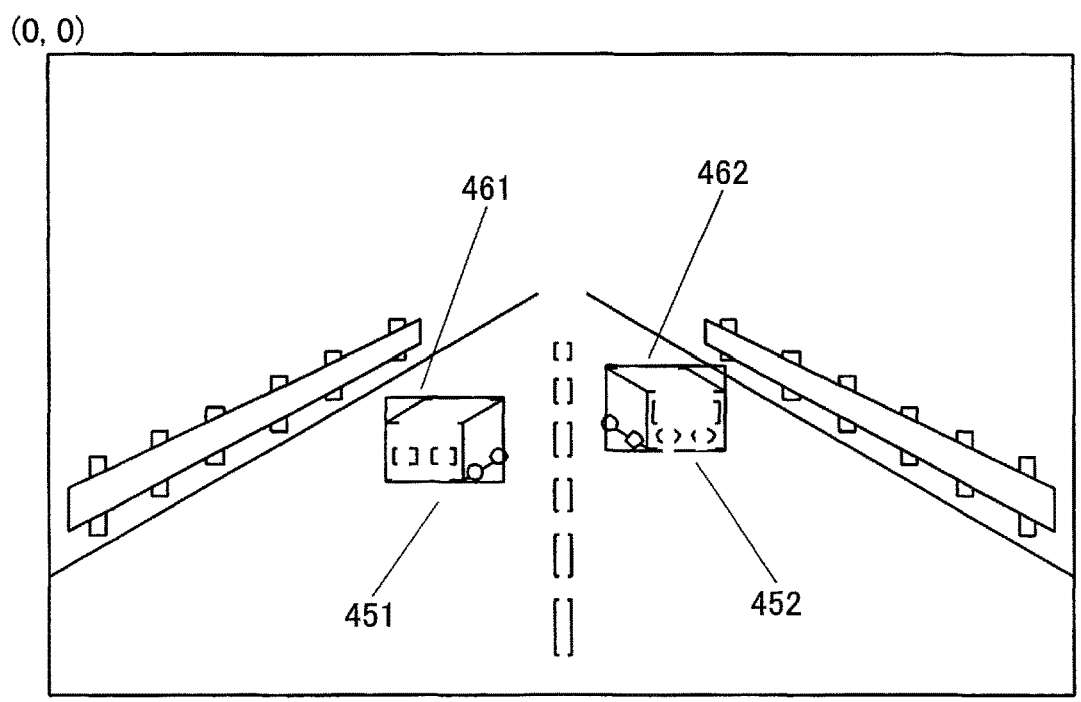
FIG. 14 is a drawing illustrating a parallax image in which an object region is set by searching the scanning range.

Next, a parallax image corresponding region detection unit 140 and an object region extraction unit 141 will be described. FIG. 12 is a drawing illustrating a real frequency U map in which rectangle regions, by which isolated regions detected by the isolated region detection unit 139 are circumscribed, are set. FIG. 13 is a drawing illustrating a parallax image in which scanning ranges corresponding to the rectangle regions are set. FIG. 14 is a drawing illustrating a parallax image in which object regions are set by searching the scanning ranges.

Regarding the isolated regions determined by the isolated region detection unit 139 as object candidate regions, as illustrated in FIG. 12, when a first detected island 811 and a second detected island 812 are set as rectangle regions in which a first vehicle 801 and a second vehicle 802 as the isolated regions are inscribed, the widths (the lengths in the X-axis direction on the U map) of the rectangle regions correspond to the widths of the recognition target objects corresponding to the isolated regions. Further, the heights of the set rectangle regions correspond to the depths (the lengths in the vehicle traveling direction) of recognition target objects corresponding to the isolated regions. With respect to the above, the height of the recognition target object corresponding to each of the isolated regions is unknown at this stage. In order to obtain the height of the object corresponding to the isolated region related to the object candidate region, the parallax image corresponding region detection unit 140 detects a corresponding region on the parallax image corresponding to the isolated region.

Based on information of the isolated regions output from the isolated region detection unit 139, the parallax image corresponding region detection unit 140 can determine X-axis direction ranges (xmin, xmax) of a scan range 481 of the first detected island corresponding region and a scan range 482 of the second detected island corresponding region, which are to be detected in the parallax image illustrated in FIG. 13, from the positions, the widths, and the minimum parallaxes of the first detected island 811 and the second detected island 812 detected from the real U map. Further, the parallax image corresponding region detection unit 140 can determine the object's height and position (from ymin, which is equal to "y coordinate value corresponding to the maximum height from the road surface at the time of the maximum parallax dmax", to ymax, which is equal to "y coordinate value indicating the height of the road surface obtained from the maximum parallax dmax") in the parallax image.

Next, in order to detect accurate positions of the objects, scanning is performed in the set scanning ranges, and pixels having parallax values within the range of the depth (the minimum parallax drain, the maximum parallax dmax) of the rectangles detected by the isolated region detection unit 139 are extracted as candidate pixels. Further, a line, in which there are equal to or more than a predetermined rate of the extracted candidate pixels in the lateral direction with respect to a detection width, is determined to be an object candidate line.

Next, the scanning is performed in the longitudinal direction, and, in the case where a density of other object candidate lines existing around a specific object candidate line is greater than a predetermined density, the specific object candidate line is determined as an object line.

Next, the object region extraction unit 141 searches for an object line in a search region of the parallax image and determines a lowermost end and an uppermost end of the object line. As illustrated in FIG. 14, circumscribed rectangles 461 and 462 of the object lines are determined as regions 451 and 452 of the objects (first vehicle, second vehicle) in the parallax image.

Figure 15:
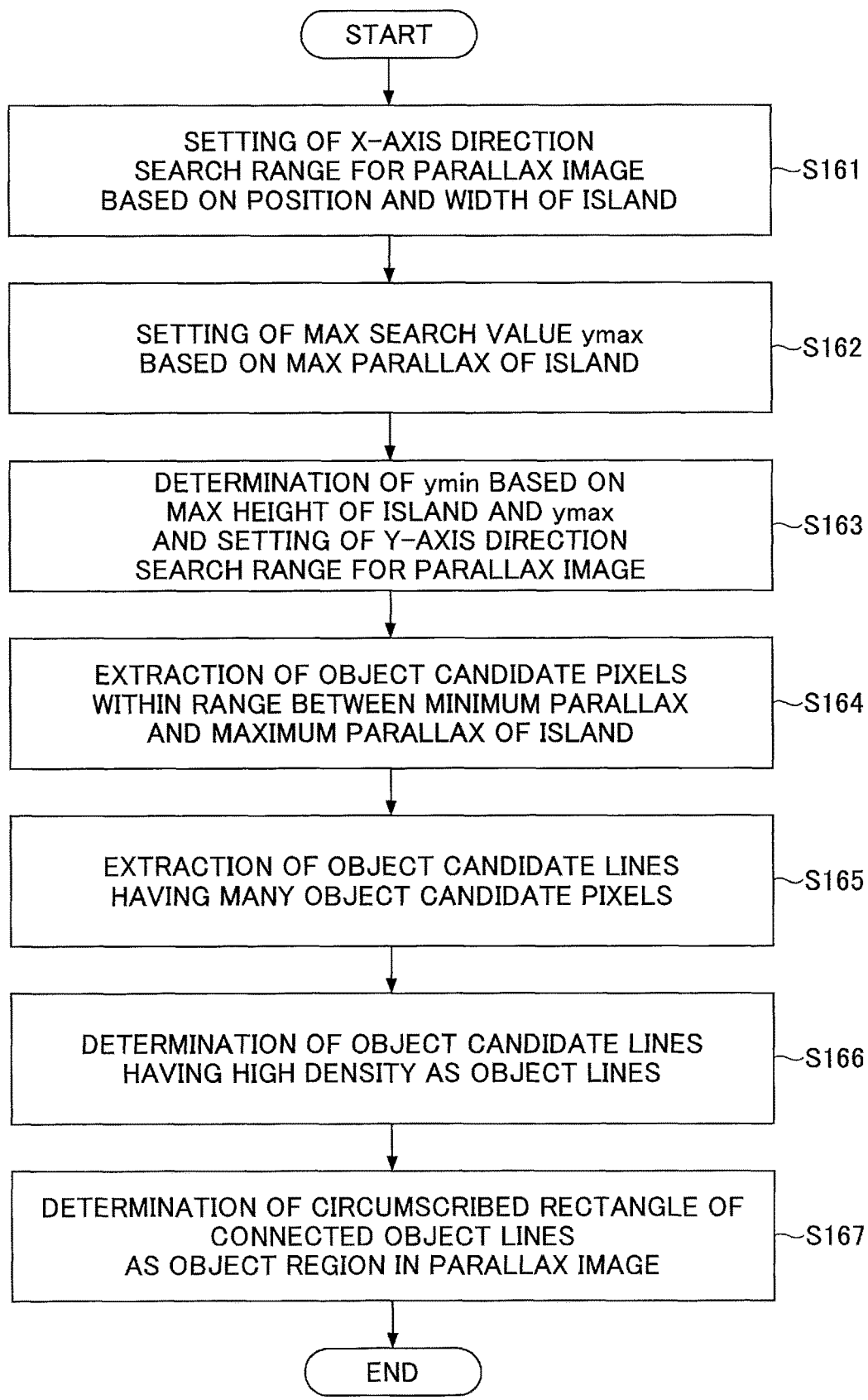
FIG. 15 is a flowchart illustrating a processing flow performed by a parallax image corresponding region detection unit and an object region extracting unit.

FIG. 15 is a flowchart illustrating a processing flow performed by the parallax image corresponding region detection unit 140 and the object region extracting unit 141. First, a search range of the x-axis direction for the parallax image is set based on the position, the width, and the minimum parallax of the island in the real U map (step S161).

Next, a maximum search value ymax of the y-axis direction for the parallax image is set based on the relationship between the maximum parallax dmax of the island and the road surface height (step S162). Next, a search range of the y-axis direction for the parallax image is set by determining a minimum search value ymin of the y-axis direction for the parallax image based on the maximum height of the island in the real height U map, and the ymax and the dmax that have been set in step S162 (step S163).

Next, pixels within a range between the minimum parallax dmin and the maximum parallax dmax of the island are extracted by searching the parallax image in the search range, and the pixels are determined to be object candidate pixels (step S164). When there are equal to or more than a predetermined rate of the extracted candidate pixels in the lateral direction in a line, the line is extracted as an object candidate line (step S165).

In the case where a density of the object candidate lines is calculated and the calculated density is greater than a predetermined value, the line is determined to be an object line (step S166). In the last step, the circumscribed rectangle of the object line group is detected as the object region in the parallax image (step S167).

According to the above, it is possible to recognize a recognition target object.

<<Object Type Classification>>

Next, an object type classification unit 142 will be described.

An actual height Ho of the recognition target object captured in the image region corresponding to the object region can be calculated from the height (yomax−yomin) of the object region extracted by the object region extraction unit 141, based on the following formula [2]. It should be noted that "zo" is a distance between the object, corresponding to the object region, and the vehicle calculated from the minimum parallax value d in the object region, and that "f" is a value obtained by converting the focal distance of the camera into the unit that is the same as the unit of the height (yomax−yomin).

$$Ho=zo*(y\text{omax}-y\text{omin})/f \quad \text{Formula [2]}$$

Similarly, an actual width Wo of the recognition target object captured in the image region corresponding to the object region can be calculated from the width (xomax−xomin) of the object region extracted by the object region extraction unit 141, based on the following formula [3].

$$Wo=zo*(x\text{omax}-x\text{omin})/f \quad \text{Formula [3]}$$

Furthermore, a depth Do of the recognition target object captured in the image region corresponding to the object region can be calculated from the maximum parallax dmax and the minimum parallax dmin in the isolated region corresponding to the object region, based on the following formula [4].

$$Do=BF*\{1/(d\text{min}-\text{offset})-1/(d\text{max}-\text{offset})\} \quad \text{Formula [4]}$$

The object type classification unit 142 performs object type classification based on information of the height, the width, and the depth of the object corresponding to the object region which have been calculated as described above. The table illustrated in FIG. 16 illustrates an example of table data used for performing object type classification. In an example of FIG. 16, for example, if the width is less than 1100 mm, the height is less than 2500 mm, and the depth exceeds 1000 mm, then the object is determined to be "motorcycle, bicycle". Further, if the width is less than 1100 mm, the height is less than 2500 mm, and the depth is equal to or less than 1000 mm, then the object is determined to be "pedestrian". According to the above, it is possible to recognize the recognition target object existing ahead of the vehicle by distinguishing between a pedestrian, a bicycle or a motorcycle, a compact car, a truck, etc.

<<Three-Dimensional Position Determination>>

Next, a process of a three-dimensional position determination unit 143 will be described. The three-dimensional position determination unit 143 determines a relative three-dimensional position of the recognition target object with respect to the vehicle 100.

The three-dimensional position determination unit 143 calculates a center position of the object in the three-dimensional coordinate (real space) based on a distance to the object corresponding to the detected object region and a distance on the image between an image center of the parallax image and the center of the object region on the parallax image, by using, for example, the following formulas.

It is assumed that coordinates of the center of the object region on the parallax image are (region_centerX, region_centerY) and that coordinates of the center of the parallax image are (image_centerX, image_centerY). A center position Xo of the recognition target object in the lateral direction and a center position Yo of the identified target object in the height direction, relative to the imaging units 110a and 110b, can be calculated by using the following formula [5] and formula [6].

$$Xo=Z*(\text{region\_centerX}-\text{image\_centerX})/f \quad \text{Formula [5]}$$

$$Yo=Z*(\text{region\_centerY}-\text{image\_centerY})/f \quad \text{Formula[6]}$$

<<Object Tracking>>

Next, an object tracking unit 144 will be described. The object tracking unit 144 performs a process of tracking, in a current frame, of an object that has been detected in a previous frame (a frame in the past).

The object tracking unit 144 includes a prediction unit 1441 and an extraction unit 1442.

The prediction unit 1441 predicts a position of a predetermined object in a current frame based on a position of the predetermined object detected in the previous frame. Specifically, the prediction unit 1441 determines relative moving speeds and relative moving directions of the objects with respect to the vehicle 100 based on positions of each of the objects in a plurality of previous frames, and predicts the position of each of the objects in the parallax image of the current frame based on the determined moving speed and the moving direction. It should be noted that known techniques can be applied to the object tracking process.

The extraction unit 1442 extracts from the current frame a plurality of objects that satisfy conditions related to the position predicted by the prediction unit 1441. Further, the extraction unit 1442 extracts, based on the degree of similarity between each image of the objects and the image of the predetermined object, the same object as the predetermined object.

Figure 17:
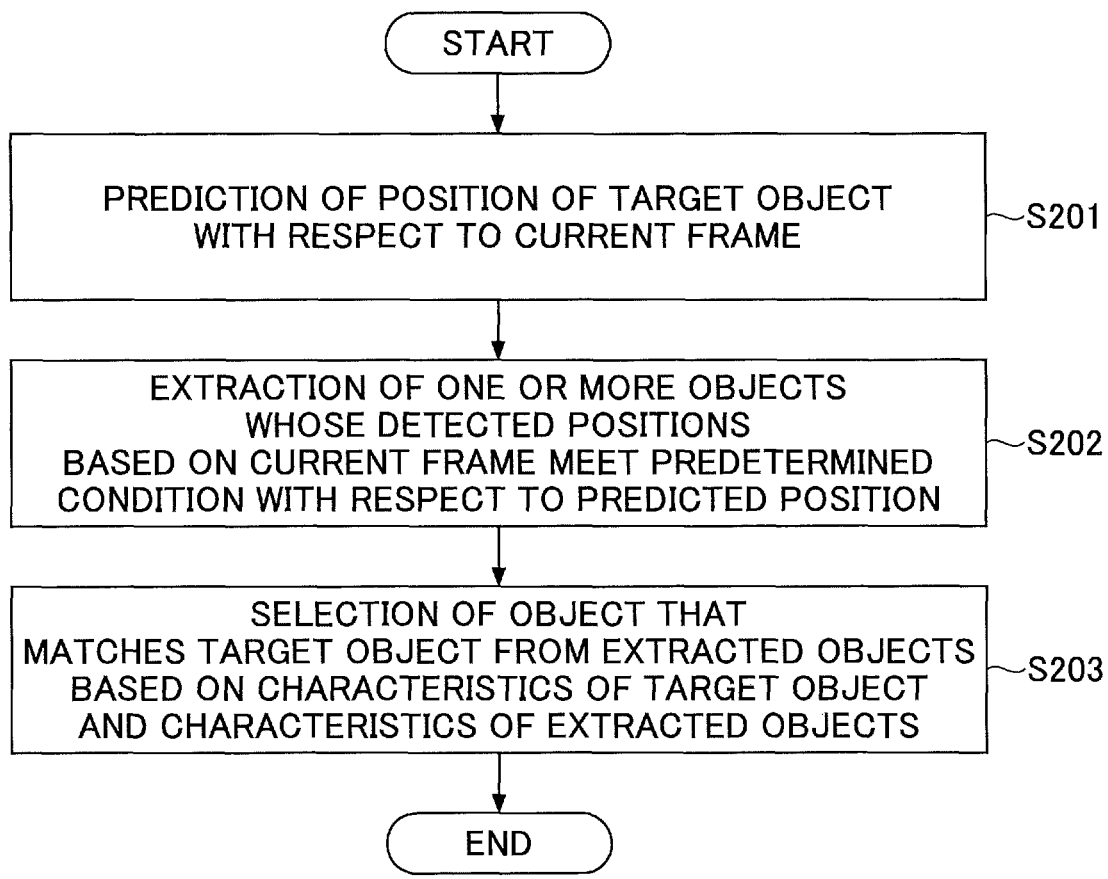
FIG. 17 is a flowchart illustrating an example of an object tracking process.

Next, referring to FIG. 17, an object tracking process performed by the object tracking unit 144 will be described. FIG. 17 is a flowchart illustrating an example of the object tracking process. It should be noted that, referring to FIG. 17, a process with respect to one (target object) of the objects extracted by the object region extraction unit 141 will be described. The process illustrated in FIG. 17 is performed for each of the objects extracted by the object region extraction unit 141.

In step S201, the prediction unit 1441 of the object tracking unit 144 predicts a position of the target object with respect to the current frame, based on positions of the target object determined by the three-dimensional position determination unit 143 based on the plurality of previous frames. For example, the prediction unit 1441 uses, as a relative speed with respect to the vehicle, a difference between a position of the target object in the frame one frame prior to the previous frame and a position of the target object in the previous frame. Further, the prediction unit 1441 predicts, as a position of the target object in the current frame, a position moved from the position of the target object in the previous frame by an amount corresponding to the relative speed. In other words, for example, in the case where the relative speed on the real U map is indicated by 1 m/frame in the lateral direction (X-axis direction) and 2 m/frame in the depth direction (Y-axis direction), a position moved from the previous position by 1 m in the lateral direction and 2 m in the depth direction is predicted as a position of the target object in the current frame. It should be noted that the prediction of the position in step S201 may be performed by using other known techniques.

Next, the extraction unit 1442 of the object tracking unit 144 extracts one or more objects whose positions detected in the current frame satisfy a predetermined condition with respect to the position of the target object predicted in step S201 (step S202). It should be noted that a threshold value used for determining whether the predetermined condition is satisfied or not may be changed based on the setting, etc. Further, the extraction unit 1442 may change the threshold value in the case where the number of the objects detected in the current frame is equal to or greater than a predetermined number, or in the case where the number of tracking objects is equal to or greater than a predetermined number, in such a way that the predetermined condition becomes difficult to be satisfied. According to the above, it is possible to reduce the possibility of making wrong determination in which, in the case where the vehicle is traveling on a road where relatively many obstacles are detected, an object detected in the current frame is determined to be the same as another object detected in the previous frame.

Next, the extraction unit 1442 of the object tracking unit 144 extracts an object, of the extracted objects, that matches the target object based on the characteristics of the target object and the characteristics of each of the extracted objects (step S203). According to the above, the same object is recognized as the same object throughout the plurality of frames.

In step S203, for example, a feature value of an image may be used as a characteristic of the object. In this case, for example, the feature value of an image may be calculated by using known methods including higher-order local autocorrelation (HLAC), HOG (histogram of oriented gradient), etc.

The HLAC is a method of extracting characteristics of an image by enhancing autocorrelation of a function g(x, y) representing brightness of an image to Nth order, and limiting displacements ai and bi of g(x, y)g(x+a1, y+b1)—g(x+aN, y+bN) to a local region of the peripheral of a reference pixel (x,y). When the order of correlation is limited to the second order (three point correlation) and the displacements are limited to the local region of 3×3 pixels, in a case of a black-and-white binary image, there are 25-dimensional patterns, and the pixel value indicated by the 25-dimensional patterns is the feature value of the image.

The HOG is a method of calculating, as the feature value, an orientation histogram of each block region with respect to an edge image calculated from an input image.

The extraction unit 1442 calculates the degree of similarity between images by comparing the feature value of an image of the target object in the previous frame with the feature value of each image of the extracted objects. For example, the extraction unit 1442 calculates, as the degree of similarity between two images, an Euclidean distance between the 25-dimensional feature values of the two images calculated by using the HLAC, etc. Further, the extraction unit 1442 determines, for example, that the object with the highest degree of similarity is the target object in the current frame.

It should be noted that, not only the feature value of the image, but also the position of the object, may be used as a characteristic of the object. For example, a score may be used whose value becomes higher as the feature value of the image is closer to the target object and the position of the object is closer to the predicted position.

Further, the overlapping degree of the object region in the parallax image or the reference image may be used as a characteristic of the object. For example, a score may be used whose value becomes higher as the feature value of the image is closer to the target object, the position of the object is closer to the predicted position, and the overlapping degree of the object region in the parallax image or the reference image is higher.

Figure 18:
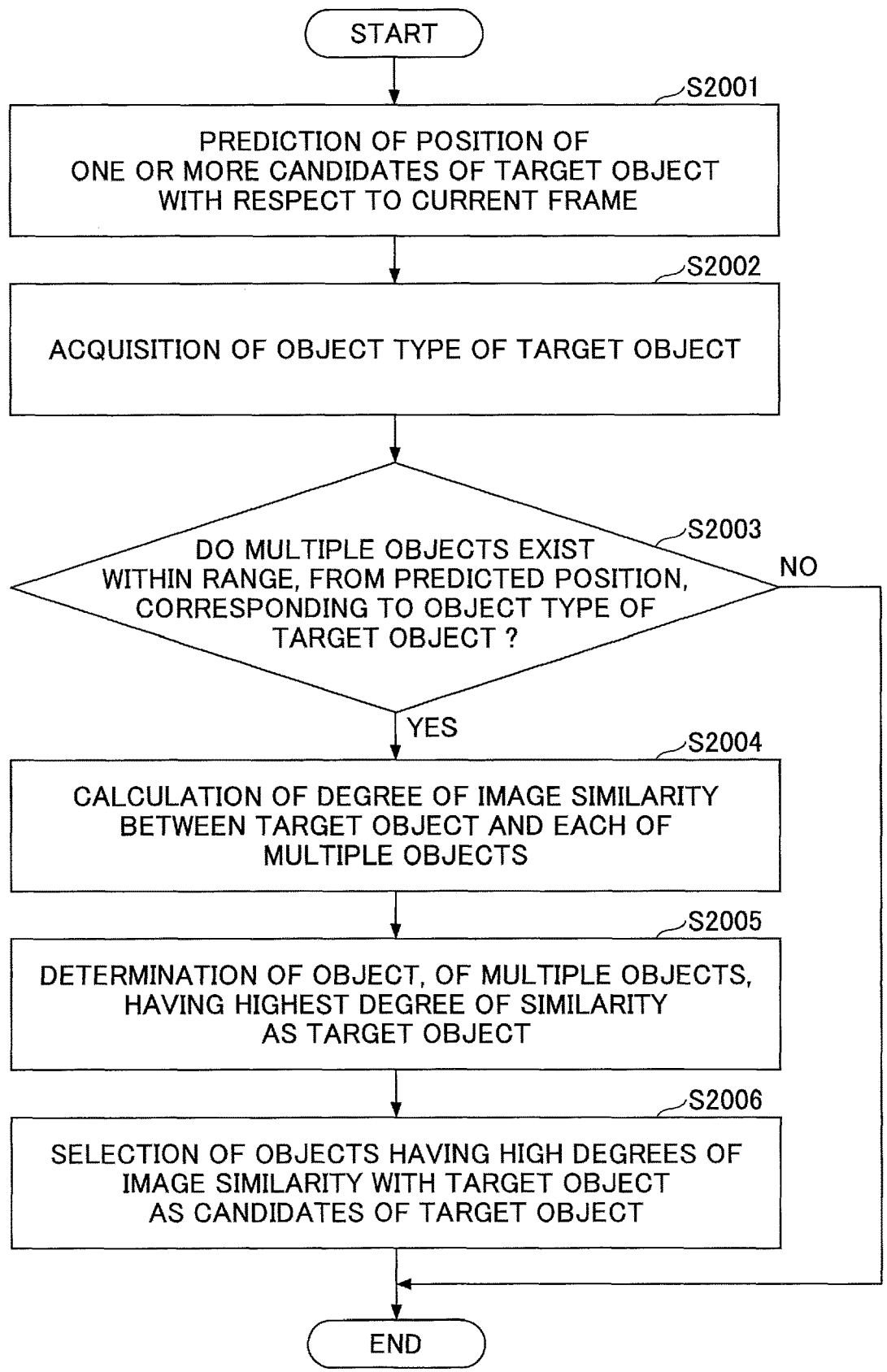
FIG. 18 is a flowchart illustrating a detailed example of the object tracking process.

Next, referring to FIG. 18, a detailed example of the object tracking process illustrated in FIG. 17 will be described. FIG. 18 is a flowchart illustrating the detailed example of the object tracking process.

In step S2001, the prediction unit 1441 predicts a position (predicted position) of each of one or more candidates of the target object in the current frame based on positions of the one or more candidates of the target object determined by the three-dimensional position determination unit 143 based on a plurality of previous frames. It should be noted that the candidates of the target object will be described later.

Next, the extraction unit 1442 obtains an object type of the target object determined by the object type classification unit 142 (step S2002).

Figure 19A:
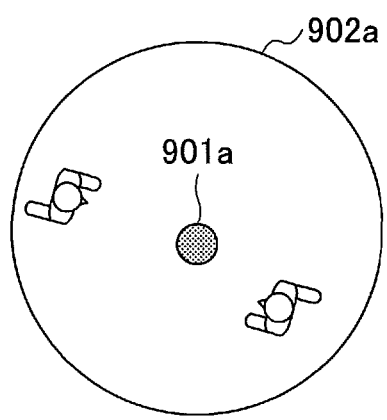
FIGS. 19A-19B are drawings illustrating real distance ranges according to object types of target objects.
Figure 19B:
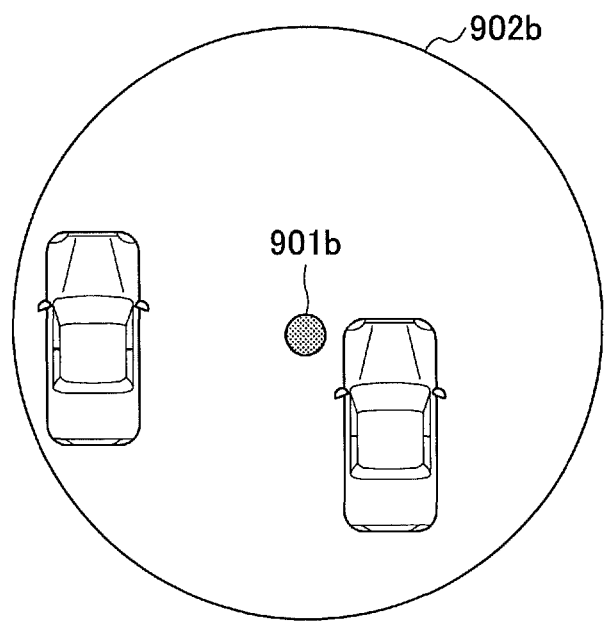

Next, the extraction unit 1442 determines whether there are multiple objects that are detected in the current frame within a real distance range corresponding to the object type of the target object from a predicted position of each of the one or more candidates of the target object predicted in step S2001 (step S2003). Here, the range corresponding to the object type may be, for example, a range within 2 m radius from the predicted position in a case where the object type is "pedestrian", or a range within 3 m radius from the predicted position in a case where the object type is "compact car". FIGS. 19A-19B are drawings illustrating real distance ranges according to the object type of the target object. FIG. 19A illustrates an example of a real distance range 902a from a predicted position 901a in a case where the object type of the target object is "pedestrian". FIG. 19B illustrates an example of a real distance range 902b from a predicted position 901b in a case where the object type of the target object is "compact car". As described above, in a case where a relative speed of the object type with respect to the vehicle is considered to be relatively high, the real distance range from the predicted position is set to relatively a wide range.

In a case where there are not multiple objects (NO in step S2003), the process ends. In this case, an object that exists within the range may be determined to be an object that matches the target object, and the object may be tracked in the subsequent frames.

In a case where there are multiple objects (YES in step S2003), the extraction unit 1442 calculates the degree of similarity to the image of the target object with respect to each of the multiple objects (step S2004). It should be noted that, regarding the image of the target object, an average value of images in the region of the target object in luminance images or parallax images of a plurality of previous frames may be used. Alternatively, an image may be used when the target object is determined to be a tracking target.

Next, the extraction unit 1442 determines that an object, of the multiple objects, with the highest degree of similarity to the image of the target object is an object that matches the target object (step S2005).

Next, the extraction unit 1442 selects, as candidates of the object matching the target object, a number of objects from among the multiple objects that is equal to or less than a predetermined number, in the order of degree of similarity to the image of the target object from the highest degree of similarity (step S2006).

According to the above, in the subsequent frames, not only the object that is determined to match the target object in step S2005, but also the candidates of the object that matches the target object, are used for determining the target object. As a result, even in the case where the calculated degree of image similarity of a correct object is low due to temporary reflection of light, or because the correct object is temporarily in a shadow of some object, and a wrong object is tracked as the target object in the current frame, the target object can be still correctly detected in the subsequent frames.

Modified Example

Figure 20:
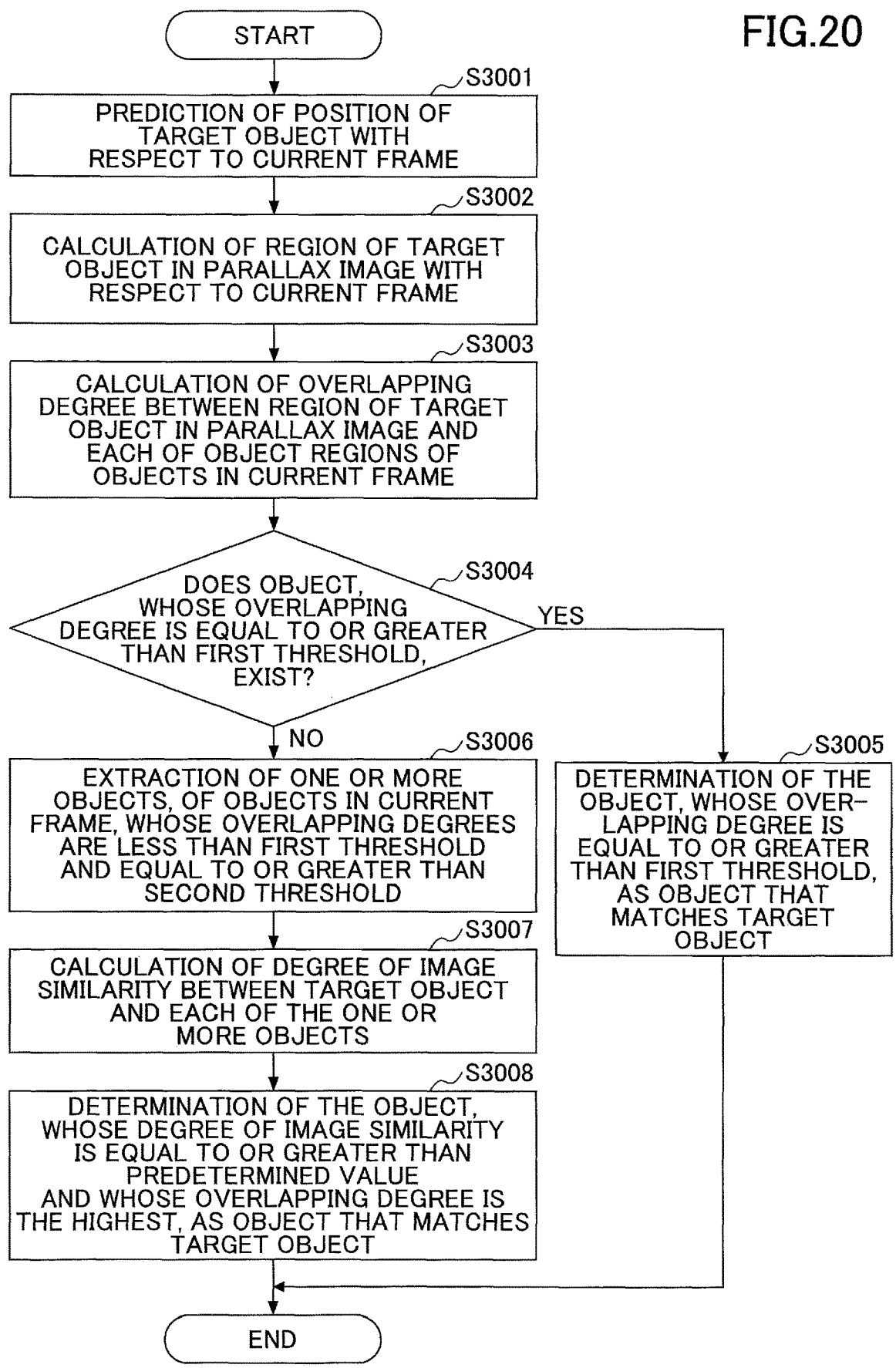
FIG. 20 is a flowchart illustrating another detailed example of the object tracking process.

Next, referring to FIG. 20, another detailed example of the object tracking process illustrated in FIG. 17 will be described. FIG. 20 is a flowchart illustrating another detailed example of the object tracking process.

In step S3001, the prediction unit 1441 predicts a position of the target object in the current frame, based on positions of the target object determined by the three-dimensional position determination unit 143 based on the plurality of previous frames.

Next, the extraction unit 1442 calculates a predicted region of the target object in the parallax image predicted for the current frame based on the predicted position calculated in step S3001 (step S3002). For example, the extraction unit 1442 calculates the region of the target object in the parallax image by applying the similar process of the parallax image corresponding region detection unit 140 described above.

Next, the extraction unit 1442 calculates the overlapping degree between the predicted region of the target object in the parallax image predicted for the current frame calculated in step S3002 and an object region of each of the objects in the current frame extracted by the object region extraction unit 141 (step S3003).

Here, the overlapping degree is a value indicating the matching degree of two regions. For example, in the case where it is assumed that an area of a region of the target object in the parallax image predicted for the current frame is L, an area of an object region of an object in the current frame is K, and an area of a region in which the two regions are overlapped is M, the overlapping degree may be a ratio between M and K+L. In this case, the overlapping degree W may be calculated, for example, according to the following formula [7].

$$W=M/\{(K+L)/2\} \quad \text{Formula [7]}$$

Figure 21:
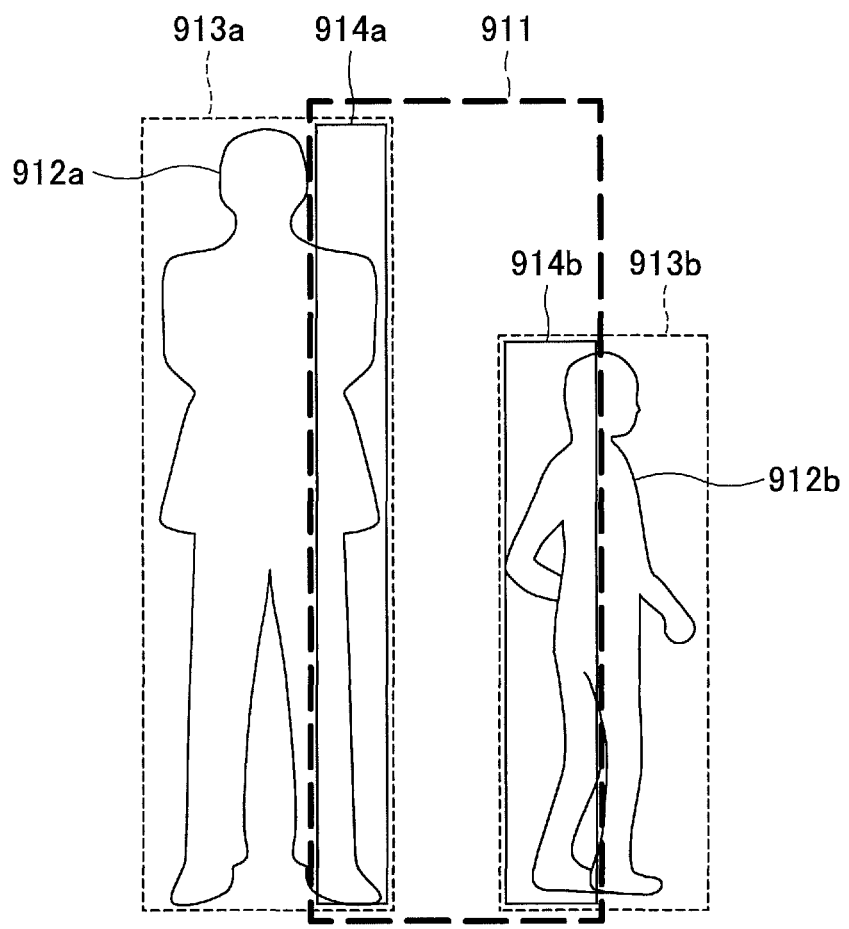
FIG. 21 is a drawing illustrating an overlapping degree.

FIG. 21 is a drawing illustrating the overlapping degree. FIG. 21 illustrates examples of overlapping regions 914a and 914b in which a region 911 of the target object in the parallax image predicted for the current frame is overlapped by object regions 913a and 913b of the corresponding objects 912a and 912b in the current frame.

Next, the extraction unit 1442 determines whether there exists an object, of the objects in the current frame, whose overlapping degree is equal to or greater than a first threshold value (step S3004).

In the case where there exists an object whose overlapping degree is equal to or greater than the first threshold value (YES in step S3004), the extraction unit 1442 determines that the object is an object that matches the target object (step S3005), and the process ends.

In the case where there does not exist an object whose overlapping degree is equal to or greater than the first threshold value (NO in step S3004), the extraction unit 1442 extracts one or more objects, of the objects in the current frame, whose overlapping degrees are less than the first threshold value and equal to or greater than a second threshold value (step S3006). It should be noted that the process may end in the case where there does not exist an object whose overlapping degree is equal to or greater than the second threshold value. In this case, for example, in the case where an object that matches the target object cannot be detected in the subsequent predetermined number of frames, the target object may be removed from tracking targets.

Next, the extraction unit 1442 calculates the degree of similarity to the image of the target object with respect to each of the one or more objects extracted in step S3006 (step S3007).

Next, the extraction unit 1442 determines that an object, of the one or more objects, whose degree of similarity to the image of the target object is equal to or greater than a predetermined value and whose overlapping degree calculated in step S3003 is the highest, is an object that matches the target object (step S3008). It should be noted that, in step S3008, for example, the extraction unit 1442 may determine that an object, of the one or more objects, whose degree of similarity to the image of the target object multiplied by a weighting factor corresponding to the overlapping degree is the highest. According to the above, even in a situation in which there is no object whose overlapping degree is equal to or greater than a predetermined value and the target object cannot be detected, it is still possible to continue the tracking with high accuracy by, in addition to extracting object candidates by applying a loosened condition, detecting the target object according to a different condition.

It should be noted that, similar to FIG. 8, candidates of the object that matches the target object may be selected in the current frame, and, in the subsequent frames, not only the object that is determined to match the target object in step S3005 or in step S3008, but also the candidates of the object that matches the target object, may be used for determining the target object. In this case, for example, equal to or less than a predetermined number of objects, whose degrees of image similarity to the target object are equal to or greater than a predetermined number, may be selected as candidates of the object that matches the target object, in the order of overlapping degree calculated in step S3003 from the highest overlapping degree.

SUMMARY

According to the above embodiments, regarding a predetermined object detected in the previous frames, a predicted position of the predetermined object in the current frame is calculated. Further, from a plurality of objects that satisfy a condition corresponding to the predicted position, the same object as the predetermined object is extracted based on the degree of similarity between an image of each of the plurality of the objects and an image of the predetermined object. According to the above, it is possible to continue the tracking with high accuracy.

It should be noted that, because a distance value and a parallax value can be treated as an equivalent value, a parallax image is used as an example of a distance image in an embodiment of the present invention. However, the distance image is not limited to a parallax image. For example, the distance image may be generated by integrating a parallax image generated by using a stereo camera with distance information generated by using a detection apparatus such as a millimeter wave radar, a laser radar, etc. Further, the detection accuracy may be further increased by using the stereo camera together with the detection apparatus such as a millimeter wave radar, a laser radar, etc., and by combining with the above-described object detection result by the stereo camera.

The system configuration in the above-described embodiments is an example. Various system configurations may be possible according to various uses and purposes. Further, it is possible to combine a part or all of the above-described embodiments.

For example, a function unit for performing at least a part of the function units of the processing hardware unit 120 and the image analysis unit 102 may be implemented by a cloud computing including one or more computers.

Further, in an embodiment of the present invention, an example, in which the device control system 1 is mounted on the vehicle 100, is illustrated. An embodiment of the present invention is not limited to this example. For example, the device control system 1 may be mounted on, as an example of other vehicles, a bike, a bicycle, a wheelchair, or an agricultural tiller. Further, the device control system 1 may be mounted, not only on a vehicle as an example of a moving body, but also on a moving body such as a robot.

Further, each function unit of the processing hardware unit 120 and the image analysis unit 102 may be implemented by hardware, or may be implemented by a CPU executing programs stored in a storage apparatus. The programs may be stored and distributed in a computer readable recording medium as files in a installable format or an executable format. Further, as an example of the recording medium, a CD-R (Compact Disc Recordable), a DVD (Digital Versatile Disk), a Blue-lay disk, etc., may be listed. Further, the programs may be stored in a computer connected to a network including the Internet, and may be provided by downloading via the network. Further, the programs may be provided or distributed via the network including the Internet.

The present invention is not limited to the specifically disclosed embodiments, and variations and modifications may be made without departing from the scope of the present invention.

The present application is based on and claims the benefit of priority of Japanese Priority Application No. 2016-228222 filed on Nov. 24, 2016 and Japanese Priority Application No. 2017-171531 filed on Sep. 6, 2017, the entire contents of which are hereby incorporated herein by reference.

What is claimed is:

1. An information processing apparatus comprising:
   a memory; and
   a processor coupled to the memory, wherein
   the processor obtains information in which positions of an object in a vertical direction, positions in a lateral direction, and positions in a depth direction at multiple points in time are associated with each other,
   the processor, based on positions of a predetermined object in the information previously obtained by the processor, predicts a position of the predetermined object in the information currently obtained by the processor,
   the processor extracts, from the currently obtained information, a plurality of objects that are detected within a distance that is predetermined based on a type of the predetermined object from the position of the predetermined object predicted by the processor, and further extracts, based on a degree of similarity between each image of the plurality of the objects and an image of the predetermined object, one of the plurality of the objects in the current information, as an object that is same as the predetermined object in the previous information.

2. The information processing apparatus according to claim 1, wherein the plurality of the objects satisfying the predetermined condition corresponding to the position of the predetermined object means that, in the current information, in the vertical direction and the lateral direction, an overlapping degree between a region in which the predetermined object exists and each region in which each of the plurality of the objects respectively exists is equal to or greater than a predetermined threshold value.

3. The information processing apparatus according to claim 1, wherein the processor extracts an object, of the plurality of the objects, whose degree of similarity to the image of the predetermined object is the highest, as-the same object as the predetermined object.

4. The information processing apparatus according to claim 1, wherein the processor extracts an object, of the plurality of the objects, as the same object as the predetermined object based on the degree of similarity and a distance from the position of the predetermined object predicted by the processor to a position of each of the plurality of the objects in the current information.

5. The information processing apparatus according to claim 1, wherein, in the case where there is, in the information subsequently obtained by the processor after the current information, information of an object, of the plurality of the objects in the current information, that satisfies the predetermined condition corresponding to the position of the predetermined object but is determined to be not the same object as the predetermined object, the processor extracts the same object as the predetermined object based on the degree of similarity between the image of the predetermined object and an image of the object.

6. An imaging apparatus comprising:
   a plurality of imaging units;
   a processor of the imaging apparatus that generates the information based on a plurality of images captured by each of the plurality of imaging units; and
   the information processing apparatus according to claim 1.

7. A device control system comprising:
the imaging apparatus according to claim 6; and
a processor of the device control system that controls a moving body based on data of the predetermined object extracted by the processor,
wherein
the plurality of imaging units are mounted on the moving body and capture images ahead of the moving body.

8. The moving body comprising: the device control system according to claim 7, wherein the moving body is controlled by the processor of the device control system.

9. The information processing apparatus according to claim 1, wherein the processor classifies the type of the predetermined object before extracting the plurality of objects.

10. An information processing method for causing a computer to perform:
obtaining information in which positions in a vertical direction, positions in a lateral direction, and positions in a depth direction, of an object at a plurality of times, are associated with each other;
based on positions of a predetermined object in the information previously obtained by the obtaining, predicting a position of the predetermined object in the information currently obtained by the obtaining;
extracting, from the currently obtained information, a plurality of objects that are detected within a distance that is predetermined based on a type of the predetermined object from the position of the predetermined object predicted by the processor, and further extracting, based on a degree of similarity between each image of the plurality of objects and an image of the predetermined object, one of the plurality of objects in the current information, as an object that is the same as the predetermined object in the previous information.

11. A non-transitory recording medium including a program for causing a computer to perform
obtaining information in which positions in a vertical direction, positions in a lateral direction, and positions in a depth direction, of an object at a plurality of times, are associated with each other;
based on positions of a predetermined object in the information previously obtained by the obtaining, predicting a position of the predetermined object in the information currently obtained by the obtaining;
extracting, from the currently obtained information, a plurality of objects that are detected within a distance that is predetermined based on a type of the predetermined object from the position of the predetermined object predicted by the processor, and further extracting, based on a degree of similarity between each image of the plurality of objects and an image of the predetermined object, one of the plurality of objects in the current information, as an object that is the same as the predetermined object in the previous information.

* * * * *